United States Patent
Wu et al.

(10) Patent No.: US 11,968,567 B2
(45) Date of Patent: Apr. 23, 2024

(54) ENHANCED RESOURCE RESERVATION FOR SIDELINK COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Tien Viet Nguyen, Bridgewater, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/410,435

(22) Filed: Aug. 24, 2021

(65) Prior Publication Data

US 2022/0124561 A1    Apr. 21, 2022

Related U.S. Application Data

(60) Provisional application No. 63/093,089, filed on Oct. 16, 2020.

(51) Int. Cl.
*H04W 72/20*    (2023.01)
*H04W 28/26*    (2009.01)
*H04W 72/0446*    (2023.01)
*H04W 80/02*    (2009.01)

(52) U.S. Cl.
CPC ....... *H04W 28/26* (2013.01); *H04W 72/0446* (2013.01); *H04W 72/20* (2023.01); *H04W 80/02* (2013.01)

(58) Field of Classification Search
CPC . H04W 28/26; H04W 72/0446; H04W 72/20; H04W 80/02; H04W 4/40; H04W 92/18
See application file for complete search history.

(56) References Cited

U.S. PATENT DOCUMENTS

| | | | |
|---|---|---|---|
| 2018/0279094 A1* | 9/2018 | Blasco Serrano | .... H04W 72/04 |
| 2020/0280961 A1* | 9/2020 | Lee | .......... H04W 4/40 |
| 2021/0100036 A1* | 4/2021 | Kim | ...... H04L 5/0055 |
| 2022/0232549 A1* | 7/2022 | Yeo | ........ H04L 5/0044 |

FOREIGN PATENT DOCUMENTS

WO    WO-2020222443 A1 * 11/2020    ........... H04L 1/0003

* cited by examiner

*Primary Examiner* — Lakeram Jangbahadur
(74) *Attorney, Agent, or Firm* — QUALCOMM Incorporated

(57) ABSTRACT

Certain aspects of the present disclosure provide techniques for enhanced resource reservation for sidelink communication. A method that may be performed by a transmitter user equipment (UE) includes transmitting a transport block (TB) in a first slot of a current reservation period, wherein the transmission of the TB reserves a future resource in the current reservation period for retransmission of the TB, indicating, when transmitting the TB, a period to periodically reserve one or more resources, in one or more future reservation periods, for transmissions of one or more other TBs, and taking action to limit or release a number of the one or more resources periodically reserved in the one or more future reservation periods for the transmissions of the one or more other TBs.

23 Claims, 16 Drawing Sheets

ENHANCED RESOURCE RESERVATION FOR SIDELINK COMMUNICATION

CROSS-REFERENCE TO RELATED APPLICATION

This application claims benefit of and priority to U.S. Provisional Application No. 63/093,089 filed Oct. 16, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages.

Certain aspects of the subject matter described in this disclosure can be implemented in a method for wireless communication by a transmitter user equipment (UE). The method generally includes transmitting a transport block (TB) in a first slot of a current reservation period, wherein the transmission of the TB reserves a future resource in the current reservation period for retransmission of the TB; indicating, when transmitting the TB, a period to periodically reserve one or more resources, in one or more future reservation periods, for transmissions of one or more other TBs; and taking action to limit or release a number of the one or more resources periodically reserved in the one or more future reservation periods for the transmissions of the one or more other TBs.

Certain aspects of the subject matter described in this disclosure can be implemented in a method for wireless communication by a receiver UE. The method generally includes detecting, in a first slot of a current reservation period, at least one sidelink transmission of a TB from a transmitter UE that indicates a period to periodically reserve one or more resources by the transmitter UE, in one or more future reservation periods and indicates a future resource in the current reservation period for retransmission of the first TB; and receiving signaling indicating a limit or a release of a number of resources periodically reserved in the one or more future reservation periods.

Certain aspects of the subject matter described in this disclosure can be implemented in a method for wireless communication by a transmitter UE. The method generally includes transmitting a TB in a first slot of a current reservation period; and reserving, when transmitting the TB, one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure can be implemented in a method for wireless communication by a receiver UE. The method generally includes detecting at least one sidelink transmission of a TB, by a transmitter UE, in a first slot of a current reservation period; and identifying, from the at least one sidelink transmission, a reservation of one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure can be implemented in an apparatus for wireless communication by a transmitter UE. The apparatus generally includes a memory and one or more processors coupled to the memory, the memory and the one or more processors being configured to: transmit a TB in a first slot of a current reservation period, wherein the transmission of the TB reserves a future resource in the current reservation period for retransmission of the TB; indicate, when transmitting the TB, a period to periodically reserve one or more resources, in one or more future reservation periods, for transmissions of one or more other TBs; and take action to limit or release a number of the one or more resources periodically reserved in the one or more future reservation periods for the transmissions of the one or more other TBs.

Certain aspects of the subject matter described in this disclosure can be implemented in an apparatus for wireless communication by a receiver UE. The apparatus generally includes a memory and one or more processors coupled to the memory, the memory and the one or more processors being configured to: detect, in a first slot of a current reservation period, at least one sidelink transmission of a TB from a transmitter UE that indicates a period to periodically reserve one or more resources by the transmitter UE, in one or more future reservation periods and indicates a future resource in the current reservation period for retransmission of the first TB; and receive signaling indicating a limit or a release of a number of resources periodically reserved in the one or more future reservation periods.

Certain aspects of the subject matter described in this disclosure can be implemented in an apparatus for wireless communication by a transmitter UE. The apparatus generally includes a memory and one or more processors coupled to the memory, the memory and the one or more processors being configured to: transmit a TB in a first slot of a current reservation period; and reserve, when transmitting the TB, one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure can be implemented in an apparatus for wireless communication by a receiver UE. The apparatus generally includes a memory and one or more processors coupled to the memory, the memory and the one or more processors being configured to: detect at least one sidelink transmission of a TB, by a transmitter UE, in a first slot of a current reservation period; and identify, from the at least one sidelink transmission, a reservation of one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure can be implemented in an apparatus for wireless communication by a transmitter UE. The apparatus generally includes means for transmitting a TB in a first slot of a current reservation period, wherein the transmission of the TB reserves a future resource in the current reservation period for retransmission of the TB; means for indicating, when transmitting the TB, a period to periodically reserve one or more resources, in one or more future reservation periods, for transmissions of one or more other TBs; and means for taking action to limit or release a number of the one or more resources periodically reserved in the one or more future reservation periods for the transmissions of the one or more other TBs.

Certain aspects of the subject matter described in this disclosure can be implemented in an apparatus for wireless communication by a receiver UE. The apparatus generally includes means for detecting, in a first slot of a current reservation period, at least one sidelink transmission of a TB from a transmitter UE that indicates a period to periodically reserve one or more resources by the transmitter UE, in one or more future reservation periods and indicates a future resource in the current reservation period for retransmission of the first TB; and means for receiving signaling indicating a limit or a release of a number of resources periodically reserved in the one or more future reservation periods.

Certain aspects of the subject matter described in this disclosure can be implemented in an apparatus for wireless communication by a transmitter UE. The apparatus generally includes means for transmitting a TB in a first slot of a current reservation period; and means for reserving, when transmitting the TB, one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure can be implemented in an apparatus for wireless communication by a receiver UE. The apparatus generally includes means for detecting at least one sidelink transmission of a TB, by a transmitter UE, in a first slot of a current reservation period; and means for identifying, from the at least one sidelink transmission, a reservation of one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure provide a non-transitory computer-readable medium comprising executable instructions that, when executed by one or more processors of a transmitter UE, cause the transmitter UE to: transmit a TB in a first slot of a current reservation period, wherein the transmission of the TB reserves a future resource in the current reservation period for retransmission of the TB; indicate, when transmitting the TB, a period to periodically reserve one or more resources, in one or more future reservation periods, for transmissions of one or more other TBs; and take action to limit or release a number of the one or more resources periodically reserved in the one or more future reservation periods for the transmissions of the one or more other TBs.

Certain aspects of the subject matter described in this disclosure provide a non-transitory computer-readable medium comprising executable instructions that, when executed by one or more processors of a receiver UE, cause the receiver UE to: detect, in a first slot of a current reservation period, at least one sidelink transmission of a TB from a transmitter UE that indicates a period to periodically reserve one or more resources by the transmitter UE, in one or more future reservation periods and indicates a future resource in the current reservation period for retransmission of the first TB; and receive signaling indicating a limit or a release of a number of resources periodically reserved in the one or more future reservation periods.

Certain aspects of the subject matter described in this disclosure provide a non-transitory computer-readable medium comprising executable instructions that, when executed by one or more processors of a transmitter UE, cause the transmitter UE to: transmit a TB in a first slot of a current reservation period; and reserve, when transmitting the TB, one or more resources in one or more future reservation periods, wherein a time slot for each of the one or more resources reserved in each of the one or more future reservation periods is determined based on the first slot and a first period-dependent offset parameter.

Certain aspects of the subject matter described in this disclosure provide a non-transitory computer-readable medium comprising executable instructions that, when executed by one or more processors of a receiver UE, cause the receiver UE to: detect at least one sidelink transmission of a TB, by a transmitter UE, in a first slot of a current reservation period; and identify, from the at least one sidelink transmission, a reservation of one or more resources in one or more future reservation periods, wherein a time slot for each of the one or more resources reserved in each of the one or more future reservation periods is determined based on the first slot and a first period-dependent offset parameter.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
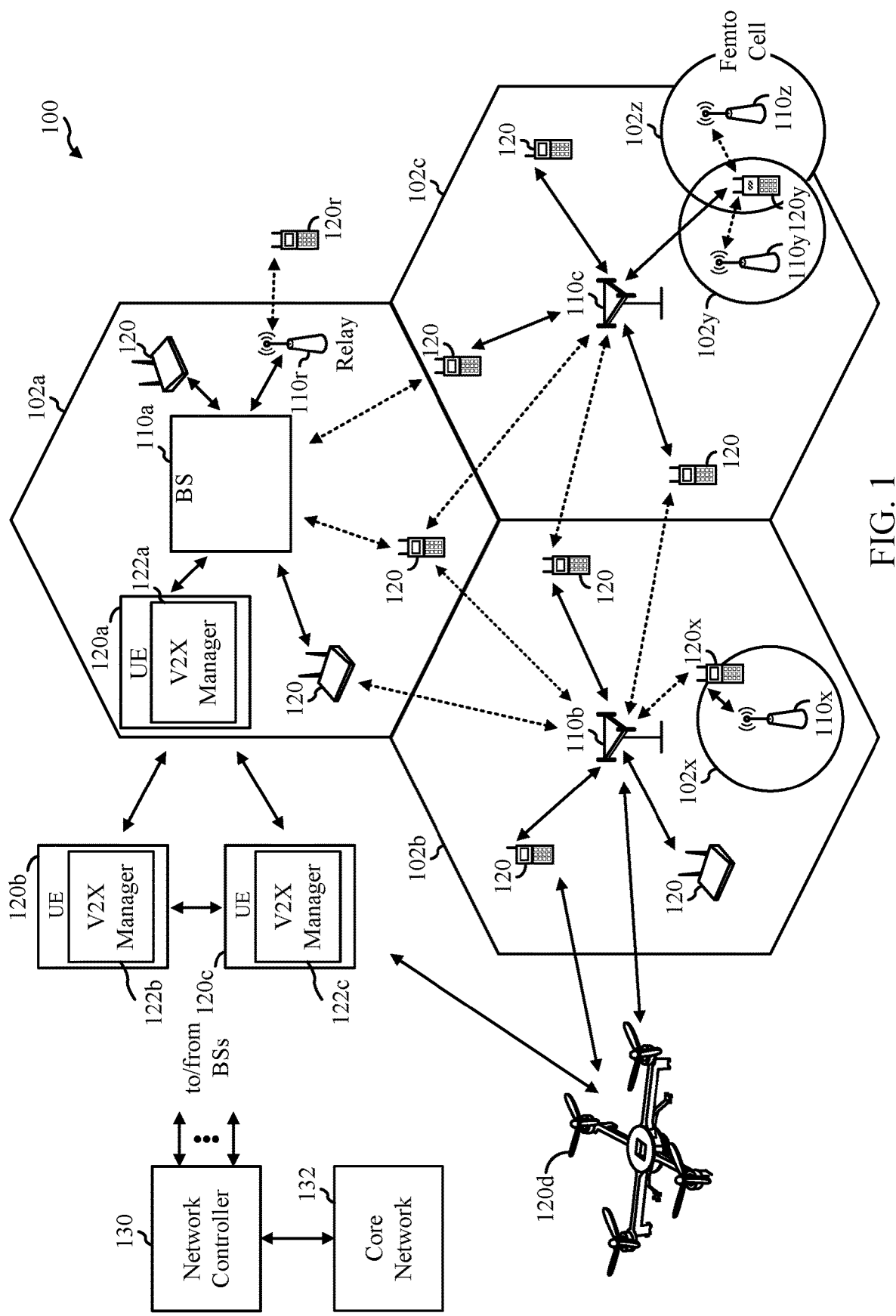
FIG. 1 is a block diagram conceptually illustrating an example wireless communication network, in accordance with certain aspects of the present disclosure.

Aspects of the present disclosure provide enhanced techniques for resource reservation for sidelink communication. As described herein, enhanced techniques for resource reservation in sidelink communications include techniques such as limiting a number of resources periodically reserved in subsequent reservation periods, releasing a number of resources periodically reserved in subsequent reservation periods, and/or staggering resources periodically reserved in subsequent reservation period. Such techniques may be implemented to make efficient use of system resources and, in some cases, allow for persistent collision avoidance.

In aspects of the present disclosure, a user equipment (UE) may reserve a number of resources (e.g., sub-channels of a frequency band) in future time periods (e.g., slots) for sidelink transmissions by the UE. For example, the UE may be operating in a cellular vehicle to everything (CV2X) communications system operating with Mode 2 resource allocation, where the UE reserves resources for itself, as opposed to Mode 1, where a base station (BS) allocates resources to the UE. The UE may inform other UEs of the reservations by indicating the reservations in sidelink control information (SCI) that the UE transmits. The UE may also learn of other reservations by other UEs by monitoring the SCIs transmitted by those other UEs, and the UE may avoid reserving resources that overlap (e.g., collide) with resources reserved by the other UEs.

The following description provides examples of enhanced resource reservation for sidelink communication, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., e.g., 24 gigahertz (GHz) to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, one or more UEs 120 (e.g., UE 120a, 120b, 120c) of the wireless communication network may have a vehicle-to-everything (V2X) manager (e.g., V2X manager 122a, 122b, 122c, respectively) configured to perform operations of FIGS. 9, 10, 12, and/or 13, when performing sidelink communications between each other.

Wireless communication network 100 may be, for example, an NR system (e.g., a 5G NR network). As shown in FIG. 1, the wireless communication network 100 may be in communication with a core network 132. The core network 132 may be in communication with one or more BSs 110 and/or UEs 120 in wireless communication network 100 via one or more interfaces.

As illustrated in FIG. 1, wireless communication network 100 may include a number of BSs 110a-z (each also individually referred to herein as BS 110 or collectively as BSs 110) and other network entities. ABS 110 may provide communication coverage for a particular geographic area, sometimes referred to as a "cell", which may be stationary or may move according to the location of a mobile BS 110. In some examples, BSs 110 may be interconnected to one another and/or to one or more other B Ss or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b, and 110c may be macro BSs for the macro cells 102a, 102b, and 102c, respectively. BS 110x may be a pico BS for a pico cell 102x. BSs 110y and 110z may be femto BSs for the femto cells 102y and 102z, respectively. ABS 110 may support one or multiple cells.

BSs 110 communicate with UEs 120a-y (each also individually referred to herein as UE 120 or collectively as UEs 120) in wireless communication network 100. UEs 120 (e.g., 120x, 120y, etc.) may be dispersed throughout wireless communication network 100, and each UE 120 may be stationary or mobile. In one example, a quadcopter, drone, or any other unmanned aerial vehicle (UAV) or remotely piloted aerial system (RPAS) 120d may be configured to function as a UE. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, network controller 130 may be in communication with core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
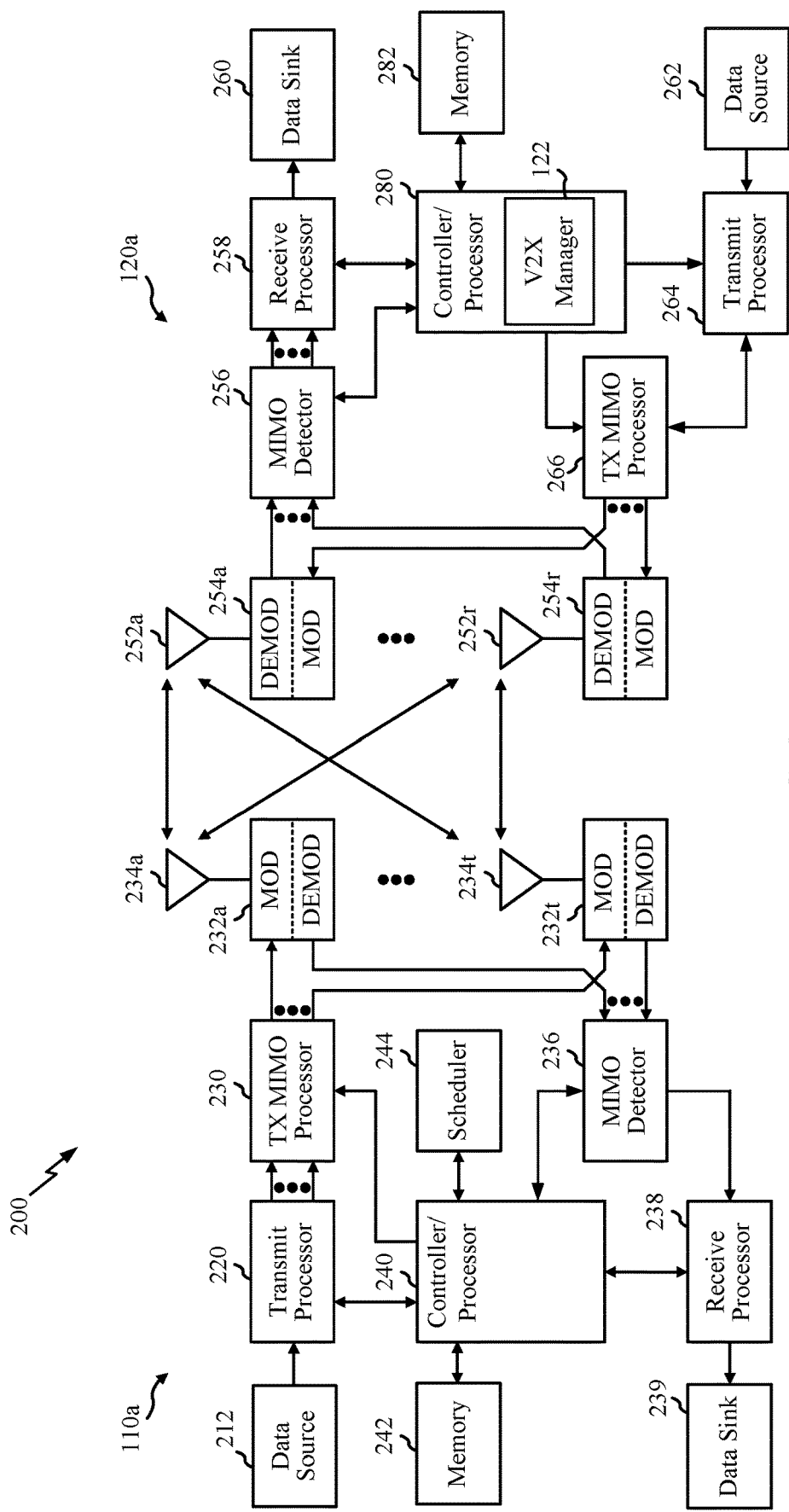
FIG. 2 is a block diagram conceptually illustrating a design of an example base station (BS) and an example user equipment (UE), in accordance with certain aspects of the present disclosure.

FIG. 2 illustrates example components of BS 110a and UE 120a (e.g., in wireless communication network 100 of FIG. 1), which may be used to implement aspects of the present disclosure. For example, one or more of the processors of UE 120a may be configured to perform (or cause UE 120a to perform) operations of FIGS. 9, 10, 12, and/or 13, when performing sidelink communications.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. A medium access control (MAC)-control element (CE) (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the modulators in transceivers 254a-254r (e.g., for single-carrier frequency division multiplexing (SC-FDM), etc.), and transmitted to BS 110a. At BS 110a, the UL signals from UE 120a may be received by the antennas 234, processed by the modulators, detected by a MIMO detector 236 if applicable, and further processed by a receive processor 238 to obtain decoded data and control information sent by the UE 120a. Receive processor 238 may provide the decoded data to a data sink 239 and the decoded control information to the controller/processor 240.

Memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a may be used to perform the various techniques and methods described herein. As shown in FIG. 2, controller/processor 280 of UE 120a includes V2X manager 122, according to certain aspects described herein. Although shown at controller/processor 280, other components of the UE 120a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
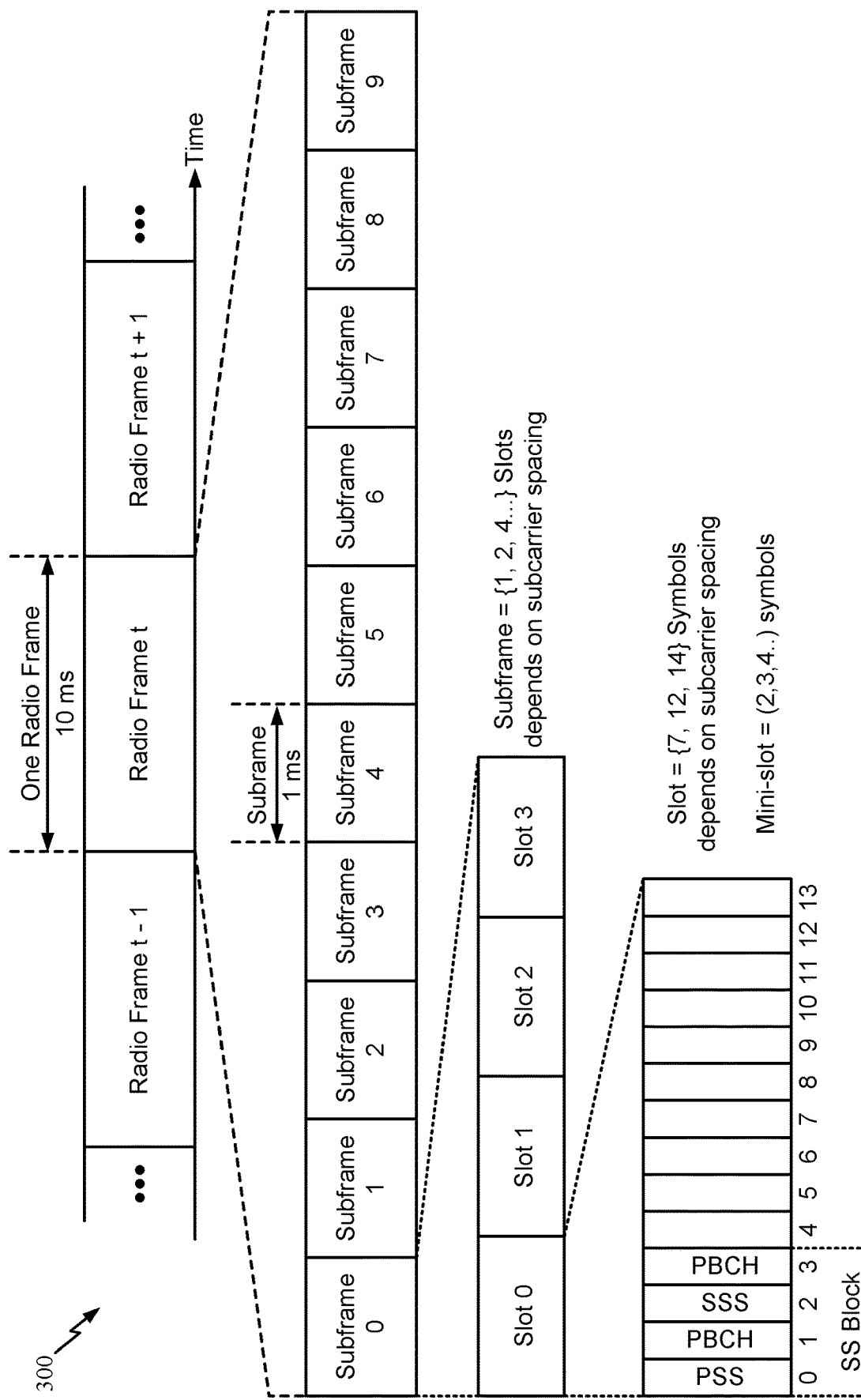
FIG. 3 is an example frame format for certain wireless communication systems (e.g., new radio (NR)), in accordance with certain aspects of the present disclosure.

FIG. 3 is a diagram showing an example of a frame format 300 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs 120 for cell search and acquisition. The PSS may provide half-frame timing, the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Sidelink Communications

While communication between UEs (e.g., UE 120 of FIGS. 1 and 2) and BSs (e.g., BSs 110 of FIGS. 1 and 2) may be referred to as the access link, and the access link may be provided via a cellular interface (e.g., Uu interface), communication between devices may be referred to as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a illustrated in FIG. 1) to another subordinate entity (e.g., another UE 120b or 120c illustrated in FIG. 1) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks (WLANs), which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4B:
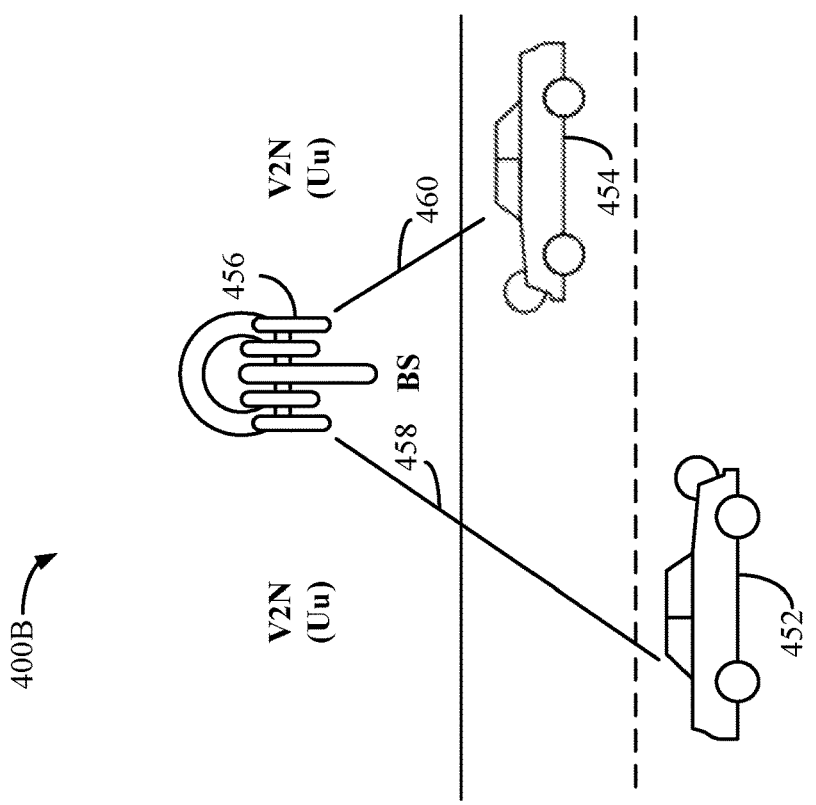
FIGS. 4A and 4B show diagrammatic representations of example vehicle to everything (V2X) systems, in accordance with certain aspects of the present disclosure.
Figure 4A:
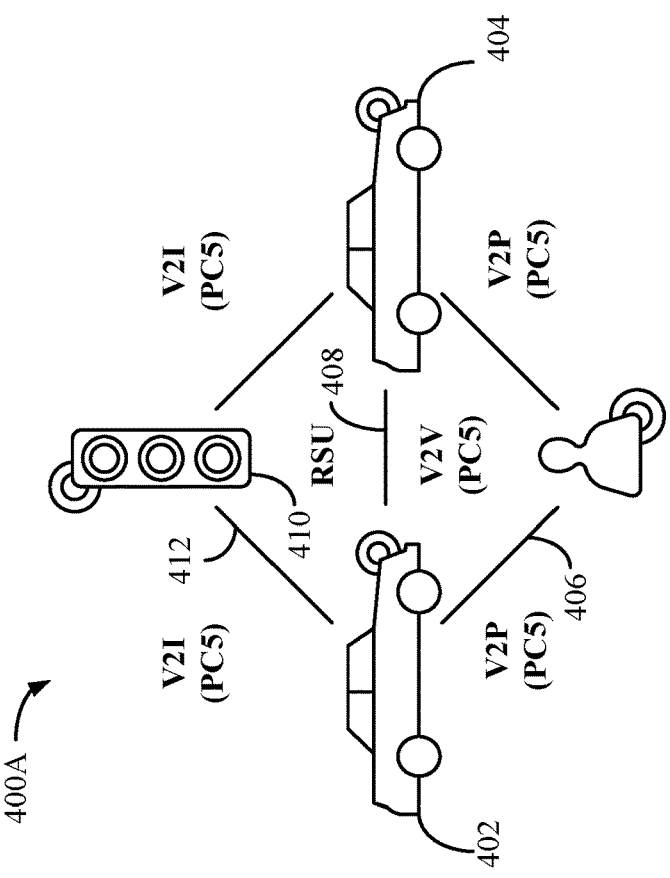

FIG. 4A and FIG. 4B show diagrammatic representations of example vehicle-to-everything (V2X) systems, in accordance with certain aspects of the present disclosure. For example, the vehicles shown in FIG. 4A and FIG. 4B may communicate via sidelink channels and may relay sidelink transmissions as described herein.

V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400A (for example, including V2V communications) is illustrated with two vehicles 402, 404 (e.g., UEs). The first transmission mode allows for direct communication between different participants in a given geographic location. As illustrated, a vehicle may have a wireless communication link 406 with an individual (i.e., vehicle-to-pedestrian (V2P)) (for example, via a UE) through a PC5 interface. Communications between vehicles 402 and 404 may also occur through a PC5 interface 408. In a like manner, communication may occur from vehicle 402 to other highway components (for example, highway component 410), such as a traffic signal or sign (i.e., vehicle-to-infrastructure (V2I)) through a PC5 interface 412. With respect to each communication link illustrated in FIG. 4A, two-way communication may take place between elements, therefore each element may be a transmitter (TX) and a receiver (RX) of information. V2X system 400A may be a self-managed system implemented without assistance from a network entity. A self-managed system may enable improved spectral efficiency, reduced cost, and increased reliability as network service interruptions do not occur during handover (HO) operations for moving vehicles. V2X system 400A may be configured to operate in a licensed or unlicensed spectrum, thus any vehicle with an equipped system may access a common frequency and share information. Such harmonized/common spectrum operations allow for safe and reliable operation.

FIG. 4B shows a V2X system 400B for communication between a vehicle 452 (e.g., UE) and a vehicle 454 (e.g., UE) through a network entity 456. These network communications may occur through discrete nodes, such as a BS (e.g., BS 110a), that sends and receives information to and from (for example, relays information between) vehicles 452, 454. The network communications through vehicle to network (V2N) links 458 and 460 (e.g., Uu links) may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data may be obtained from cloud-based sharing services.

In some cases, roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcast critical information received from some UEs. UE-type RSUs may be a reliable synchronization source.

Figure 5A:
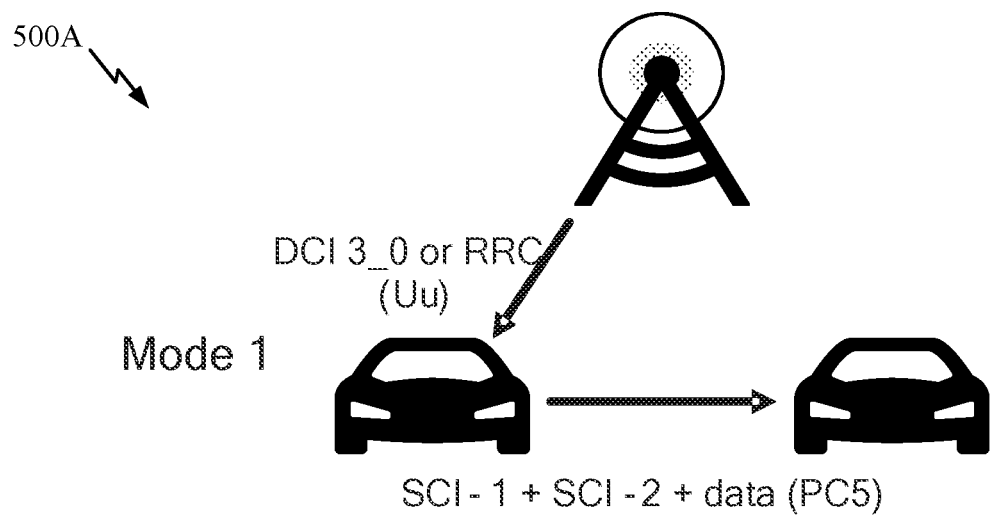
FIGS. 5A and 5B illustrate two modes of sidelink communication, in accordance with certain aspects of the present disclosure.
Figure 5B:
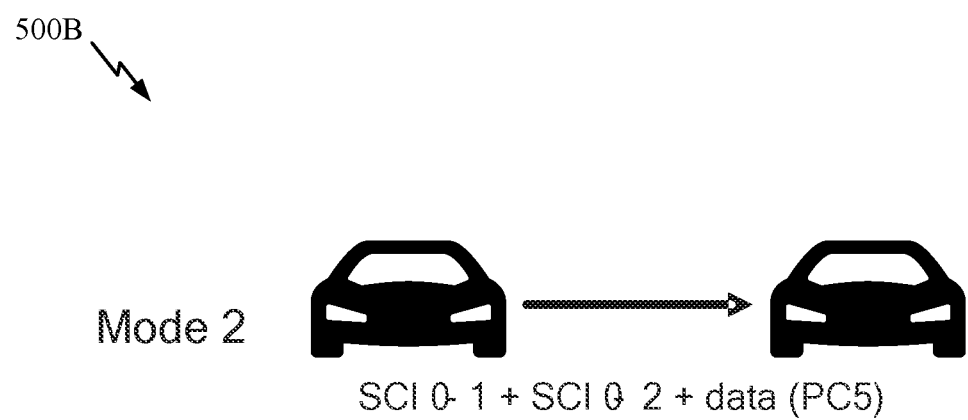

In NR, there are generally two basic sidelink resource allocation modes. FIGS. 5A and 5B illustrate two modes of sidelink communication 500A and 500B, respectively, in accordance with certain aspects of the present disclosure. RX UE behavior may be the same for both sidelink resource allocation modes.

According to a first mode (Mode 1), as shown in FIG. 5A, a BS allocates resources for sidelink communications between UEs. For example, a BS may transmit downlink control information (DCI) (e.g., DCI 3_0) to allocate time and frequency resources and indicate transmission timing. A modulation and coding scheme (MCS) may be determined by a UE within the limit set by the BS.

According to a second mode (Mode 2), as shown in FIG. 5B, UEs determine the sidelink resources (the BS does not schedule sidelink transmission resources within sidelink resources configured by BS/network). In this case, UEs autonomously select sidelink resources (i.e., UEs perform resource allocation on their own) (following some rules in the NR standard). A UE may assist in sidelink resource selection for other UEs. A UE may be configured with an NR configured grant for sidelink transmission, and the UE may schedule sidelink transmissions for other UEs.

Resource allocation Mode 2 supports reservation-based scheduling of resources. Specifically, a UE may reserve one or more (e.g., up to two in 3GPP Release 16) future resources (e.g., sub-channels of a frequency band) in future time periods (e.g., slots) for sidelink transmissions by the UE. Additionally, a TX UE may indicate the repetition of the reservation for the transmission of another transport block (TB) (this reservation can be disabled by pre-configuration) by indicating a period value of the reservation.

For example, the UE may be operating in a CV2X communications system operating with Mode 2 resource allocation, where the UE reserves resources for itself, as opposed to Mode 1, where a BS allocates resources to the UE. The UE may inform other UEs of the reservations by indicating the reservations in sidelink control information (SCI) that the UE transmits. The UE may also learn of other reservations by other UEs by monitoring the SCIs transmitted by those other UEs. Thus, the UE may avoid reserving resources that overlap (e.g., collide) with resources reserved by the other UEs.

According to aspects of the present disclosure, a UE may reserve one or more (e.g., up to two) future resources (e.g., in addition to a current resource) for a transmission (e.g., for retransmission of a packet (e.g., TB)). In some cases, resource reservation may be chained.

Figure 6:
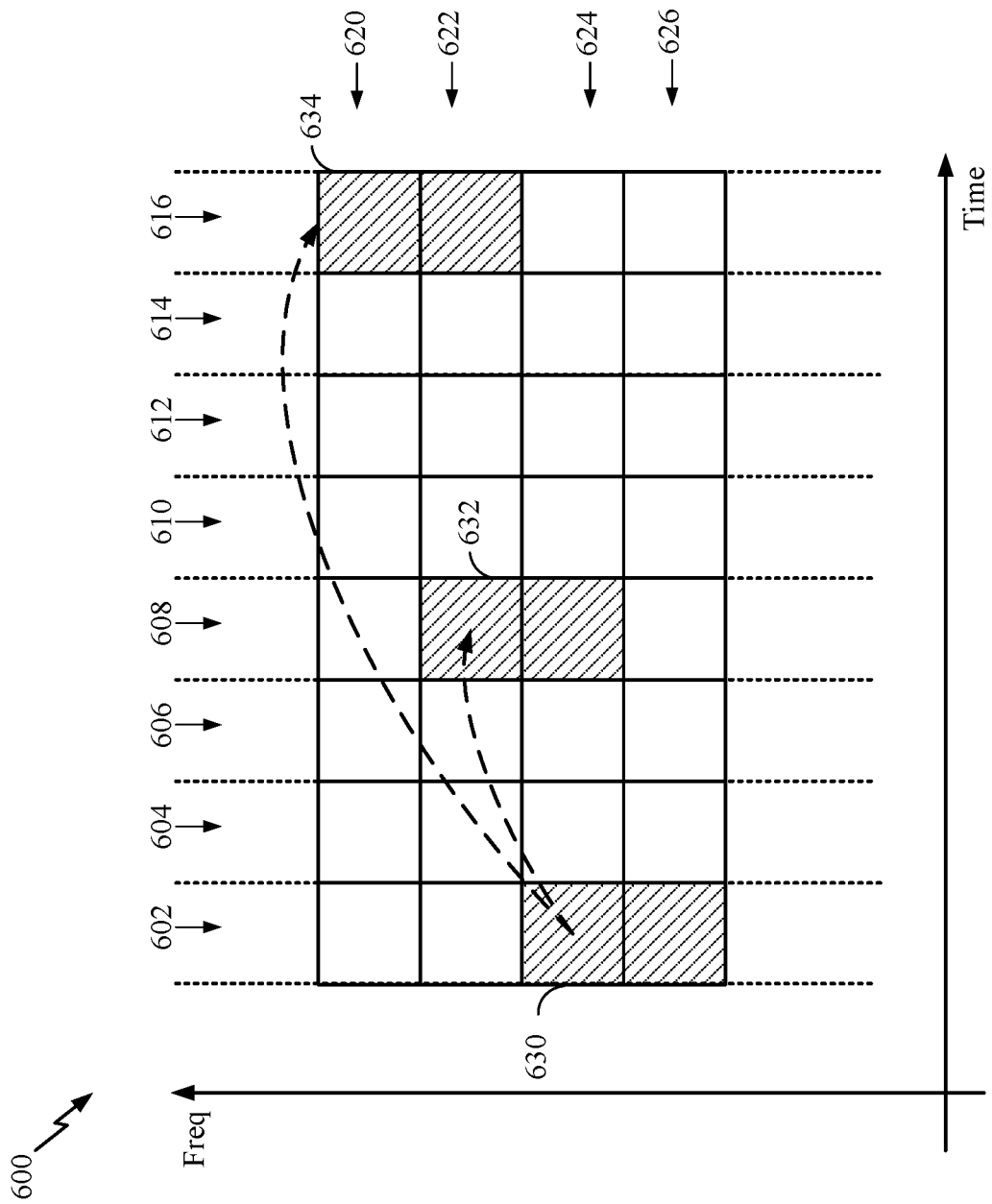
FIG. 6 is an exemplary transmission timeline illustrating transmissions and resource reservations by a cellular V2X (CV2X) device, in accordance with certain aspects of the present disclosure.

FIG. 6 is an exemplary transmission timeline 600 illustrating transmissions and resource reservations by a CV2X device, in accordance with certain aspects of the present disclosure. Exemplary transmission timeline 600 includes slots 602, 604, 606, 608, 610, 612, 614, and 616, as well as sub-channels 620, 622, 624, and 626. In exemplary transmission timeline 600, a UE (e.g., UE 120a shown in FIG. 1) that is a CV2X device transmits a sidelink transmission 630 during a slot 602 on the sub-channels 624 and 626. The transmission includes data and control information that may be sent in a PSCCH, for example. The control information that the UE includes in sidelink transmission 630 reserves transmission resources on sub-channels 622 and 624 during slot 608, as shown at 632. The control information in sidelink transmission 630 also reserves transmission resources on sub-channels 620 and 622 during slot 612, as shown at 634. The transmission resources may be reserved for retransmissions of the data in the sidelink transmission 630, for example.

According to aspects of the present disclosure, channel access and resource reservation may be based on sensing of the channel by a UE with data to transmit. In an example, the UE first identifies available resources for sidelink transmissions, which may be referred to as candidate resources. The UE then selects one or more, from the candidate resources, for transmission of a data or control signal. To identify available resources, the UE monitors and decodes all transmissions on the channel. The UE also measures reference signal received power (RSRP) for each of the transmissions the UE attempts to decode. The UE determines reserved resources (e.g., reserved by other UEs) according to control information in the decoded transmissions which have RSRP above a threshold. The UE may then consider other resources that are not reserved as available or candidate resources, and the UE may transmit a transmission in one or multiple resources of the candidate resources; the UE may also reserve one or multiple resources of the candidate resources using control information of the transmission. When a packet arrives for transmission (e.g., arrives at a lower protocol layer from a higher protocol layer in a protocol stack of the UE), the UE determines a sensing window (a window in the past), determines available resources based on SCI decoding and/or RSRP measurement in the sensing window, and then identifies available resources in a resource selection window (a window in the future) based on resource reservations indicated by SCIs decoded in the sensing window and by projecting measurement outcomes from the sensing window to corresponding reserved resource(s) in the selection window.

In aspects of the present disclosure, to identify available resources, a UE may decode SCI (e.g., SCI in the sensing window) to determine whether a resource in a selection window has been reserved; the measured RSRP from the transmission that reserved the resource may also be projected to the reserved resource. A UE may determine a resource in the selection window is available if the resource is not reserved or if the resource is reserved but RSRP of the transmission that reserved the resource is less than an RSRP threshold.

According to certain aspects of the present disclosure, to select a resource to use for a transmission, a UE may randomly select from the available resources.

Figure 7:
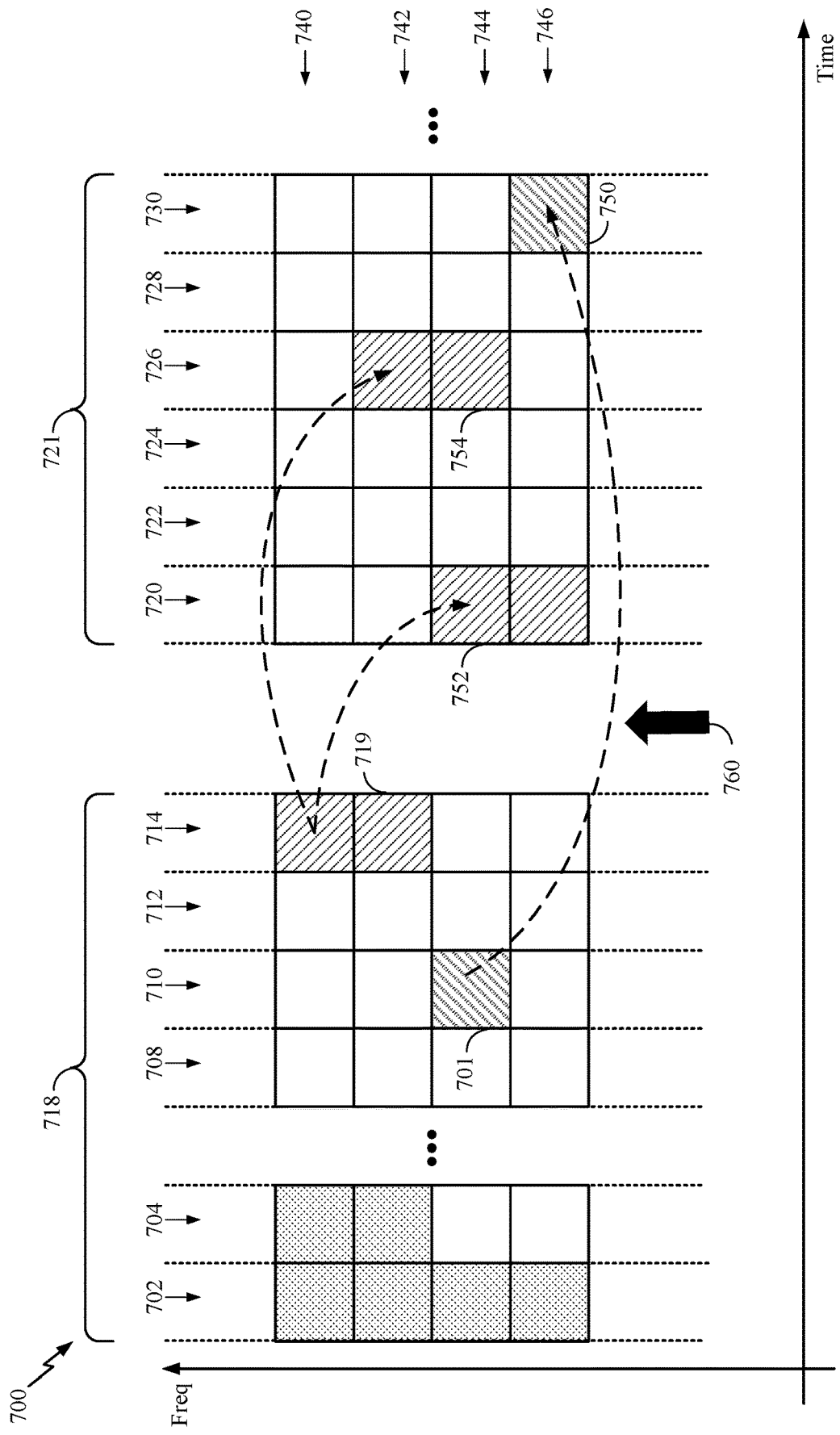
FIG. 7 is an exemplary transmission timeline illustrating resource selection for transmission by a CV2X device, in accordance with certain aspects of the present disclosure.

FIG. 7 is an exemplary transmission timeline 700, illustrating resource selection for transmission by a CV2X device, in accordance with certain aspects of the present disclosure. The exemplary transmission timeline includes slots 702, 704, 708, 710, 712, 714, 720, 722, 724, 726, 728, and 730, as well as sub-channels 740, 742, 744, and 746. In exemplary transmission timeline 700, a UE (e.g., UE 120a, shown in FIG. 1) that is a CV2X device has a packet arrive for transmission at 760. The UE attempts to decode control information during a sensing window 718. The UE determines that control information at 701 (in slot 710 on sub-channel 744) reserves transmission resources in a selection window 721 on sub-channel 746 during slot 730, as shown at 750. The control information at 719 (in slot 714 on sub-channels 740 and 742) reserves transmission resources on sub-channels 744 and 746 during slot 720, as shown at 752, in accordance with aspects of the present disclosure. The control information at 719 also reserves transmission resources on sub-channels 742 and 744 during slot 726, as shown at 754, in accordance with aspects of the present disclosure.

A UE may continue to monitor sidelink transmissions and measure RSRP for each of the transmissions. The UE performs resource selection when the UE has a packet arrive for transmission.

Example Enhanced Resource Reservation for Sidelink Communication

Aspects of the present disclosure provide enhanced techniques for resource reservation for sidelink communication. As will be described herein, enhanced techniques for resource reservation in sidelink communications may make efficient use of system resources and, in some cases, allow for persistent collision avoidance.

When reserving resources for the transmission of another transport block (TB), a number of (e.g., up to 16) resource reservation periods can be (pre-)configured from a set of candidate period values of (e.g., 1-99 ms, 0 ms, 100 ms, 200 ms, 300 ms, 400 ms, 500 ms, 600 ms, 700 ms, 800 ms, 900 ms, and 1000 ms). A parameter referred to as a resource reservation period may be used by a transmitting (TX) UE to indicate a reservation period (e.g., from the set of candidate values) in SCI format 1-A while transmitting the data channel (e.g., PSSCH).

By providing this information in SCI, other UEs, monitoring and decoding SCIs transmitted by the TX UE, may learn that the same data channel resources in one or more future periods are reserved by the TX UE for its future transmission(s). Accordingly, other UEs may avoid reserving resources that overlap (e.g., collide) with resources reserved by the TX UE.

In aspects of the present disclosure, a TX UE has capability to reserve resources in a current and/or future reservation period. For example a TX UE may reserve a number of resources in one or more future slots of a current reservation period for retransmission of a TB and may also reserve resources in slots of one or more future reservation periods for transmission/retransmission of another TB (for the next one or more periods when periodical reservation is enabled). Both types of reservations (e.g., in the current reservation period and in one or more future reservation periods) are indicated in SCI (e.g., SCI format 1-A in 3GPP Release 16).

Figure 8:
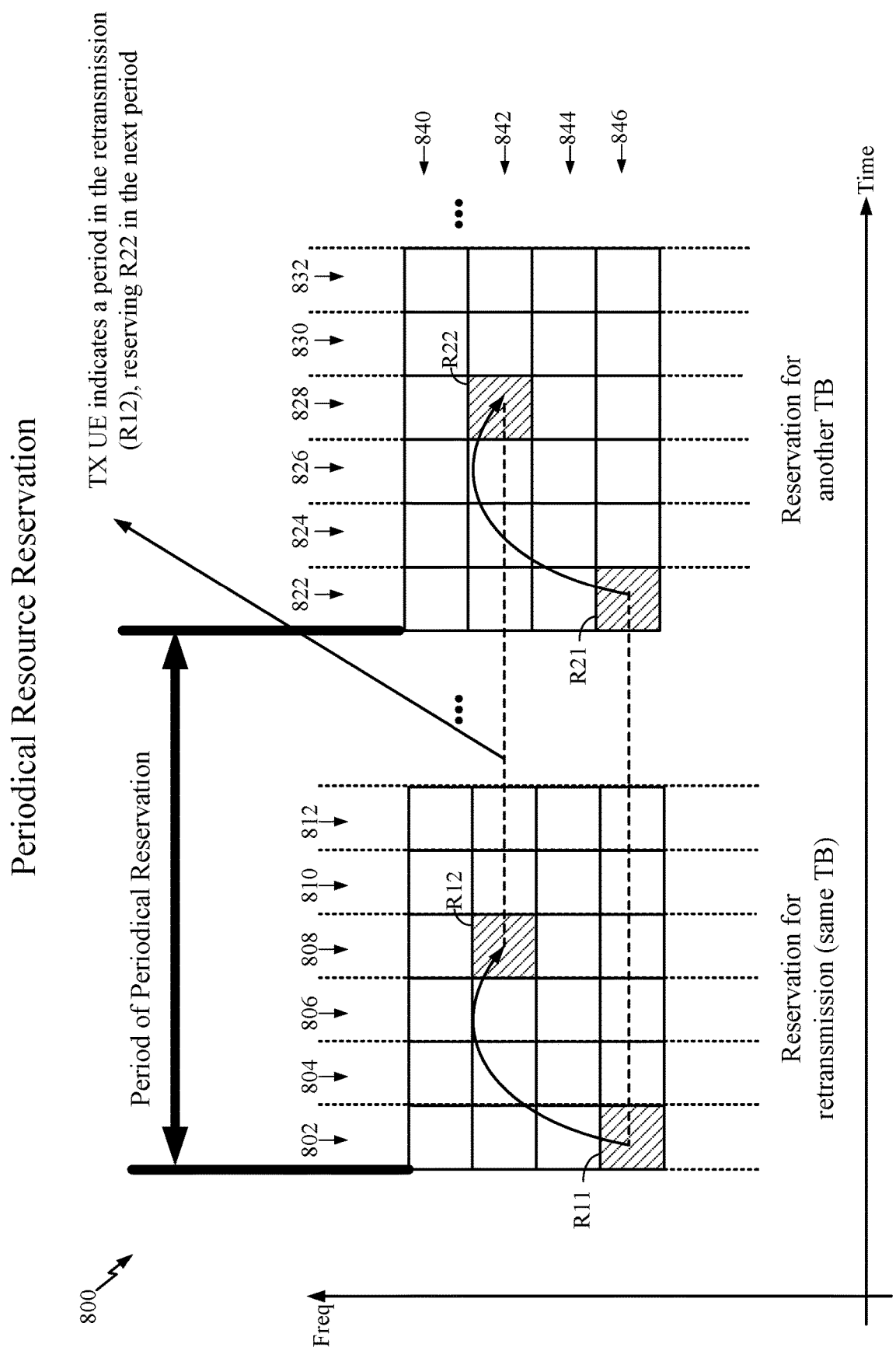
FIG. 8 is an exemplary transmission timeline illustrating periodical resource reservation by a CV2X device, in accordance with certain aspects of the present disclosure.

FIG. 8 is an exemplary transmission timeline 800 illustrating periodical resource reservation by a cellular vehicle to everything (CV2X) device, in accordance with certain aspects of the present disclosure. The NR V2X or sidelink communication system of FIG. 8 may use a hybrid automatic repeat request (HARQ) feedback mechanism. For example, a TX UE in the system may transmit a data channel, and a receiver (RX) UE that received the transmission may send an acknowledgement (ACK) or negative acknowledgement (NACK) to indicate whether the RX UE received and successfully decoded the data transmitted by the TX UE.

In exemplary transmission timeline 800 of FIG. 8, a TX UE (e.g., UE 120a, shown in FIG. 1) that is a CV2X device reserves, in each transmission, a single future resource for retransmission. For example, the TX UE transmits a first sidelink transmission (e.g., TB) on resource R11 in a first slot 802 of the first reservation period on the sub-channel 846. The transmission R11 includes data and control information that may be sent in a PSCCH, for example. Further, the TX UE indicates a reservation period which reserves resource R21 (in slot 822 on the sub-channel 846) of a subsequent reservation period. Reservation of resource R21 may be used for sidelink transmission of another TB.

The example also assumes that the control information that the TX UE includes in the first sidelink transmission of the TB on R11 also reserves a future resource R12 in the same (current) reservation period (on sub-channel 842 during slot 808) for retransmission of the same TB.

If the TX UE receives NACK feedback after the initial sidelink transmission of the TB on R11, the TX UE will retransmit the TB in the reserved resource R12. Based on the current 3GPP specification, the TX UE may indicate a period value in the retransmission (i.e., may indicate the same period value corresponding to R21) which corresponds to the reservation of resource R22 in slot 828 on sub-channel 842 of the subsequent reservation period. As illustrated, when the TX UE transmits another TB in the subsequent reservation period (e.g., on R21), that transmission may indicate the reservation of R22 to ensure the periodical reservation (reserved by the previous retransmission on R12) and retransmission reservation (reserved by the initial TB transmission on R21) are aligned. In some cases, although not shown, the TX UE may indicate a different period value than the period value corresponding to R21.

In some cases, the TX UE may further reserve another future resource (e.g., R13, not shown in FIG. 8) within the period for another retransmission (i.e., reservation for retransmission can be chained). However, assuming there is no NACK received following the retransmission (for example, no NACK following the retransmission on resource R12, as shown in FIG. 8), the TB is considered to be successfully delivered. At this point, no additional retransmissions are needed. Accordingly, the third resource reserved in the period R13 may not be used, or needed for retransmission of the TB, by the TX UE.

In the illustrated example, two resources in the subsequent reservation period (e.g., resources R21 and R22) have been reserved by periodical reservation. Unfortunately, a periodic reservation mechanism may lead to over-reservation in some cases and, in some cases, may lead to persistent collision.

Resource over-reservation may be understood by considering that a packet (e.g., a TB), configured by sl-MaxTX TransNumPSSCH-r16, may be transmitted up to thirty-two times. With bad channel conditions and/or severe interference, all thirty-two transmissions may be utilized. For periodical transmission, a TB repeated thirty-two times in one period (e.g., the current reservation period) means that there are resources in thirty-two TX occasions being reserved in subsequent one or more periods (e.g., the same resources may be reserved in a subsequent period). Because these resources are reserved, other UEs, by decoding the TX UE's SCIS, will treat these resources as being unavailable. If channel conditions get better, the TX UE may not need that many resources for transmission/retransmission of TBs in a future period. Thus, the TX UE's over-reservation of resources may lead to resource waste.

Beyond resource waste, periodical reservation of resources may lead to persistent collision. As shown in FIG. 8, periodical reservation allows a TX UE to reserve resources in a subsequent period which have the same time and frequency locations (i.e., a repeated pattern) as resources in the current period. Thus, in a first type of persistent collision, if one or more TX UEs have the same traffic period and select the same/overlapped resource for transmission in the current period, then their transmission in subsequent periods will continue to be on the same/overlapped resource. In a second type of persistent collision, if one or more TX UEs having the same traffic period select a resource in the same transmission occasion (e.g., slot) in the current transmission period, then their transmission in subsequent periods will continue to be in the same slot. While, in the second type of persistent collision, transmissions of the TX UEs may not directly collide, multiple TX UEs transmitting in the same slot does not allow each TX UE to hear the other due to a half-duplex constraint (e.g., the inability to receive and transmit data in the same frequency at the same time). Thus, in both cases of persistent collision, when transmissions of one or more UEs collide in a current reservation period, transmission of the one or more UEs continue to collide in subsequent periods (e.g., persistent collision).

Accordingly, aspects of the present disclosure provide enhanced techniques for resource reservation in sidelink communication which address issues such as the over-reservation of resources and persistent collision. As will be described in more detail below, enhanced techniques for resource reservation in sidelink communications may make efficient use of system resources and, in some cases, allow for persistent collision avoidance.

In aspects of the present disclosure, a TX UE may be configured for periodical resource reservation in sidelink communications. However, periodical resource reservation may lead to issues in sidelink communication, such as, the over-reservation of resources for periodical transmission and persistent collision. Thus, techniques such as limiting a number of resources periodically reserved in subsequent reservation periods, releasing a number of resources periodically reserved in subsequent reservation periods, and/or staggering resources periodically reserved in subsequent reservation periods may be implemented for resource reservation in sidelink communications.

In certain aspects of the present disclosure, a TX UE may transmit a TB in a first slot of a current reservation period and indicate, when transmitting the TB, a period to periodically reserve one or more resources, in one or more future reservation periods. The TX UE may further reserve, when transmitting the TB, a future resource in the current reservation period for retransmission of the TB. To address the over-reservation of resources, the UE may take action to limit or release a number of resources periodically reserved in subsequent reservation periods.

Figure 9:
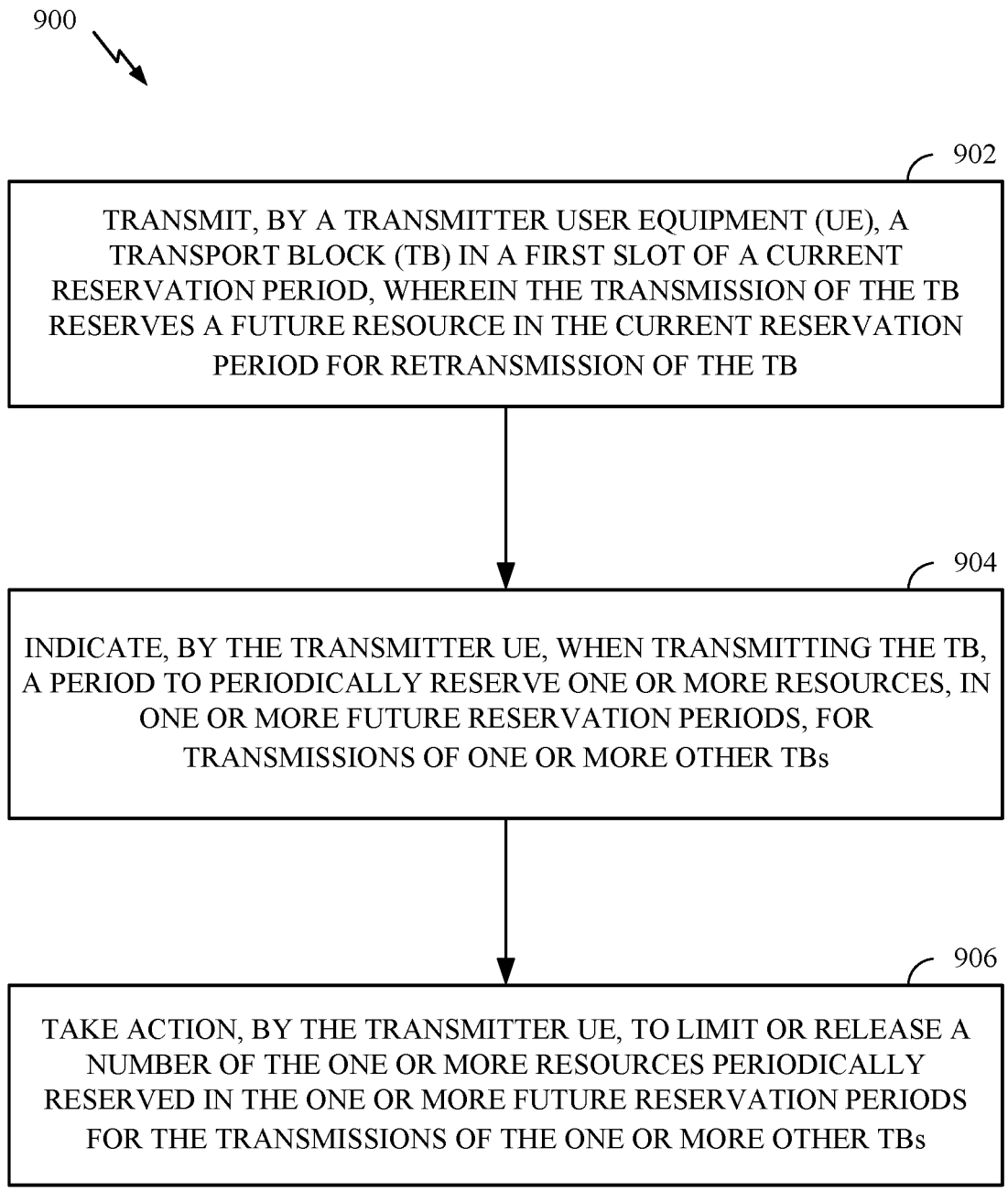
FIG. 9 is a flow diagram illustrating example operations for wireless communication by a transmitter (TX) UE, in accordance with certain aspects of the present disclosure.

FIG. 9 is a flow diagram illustrating example operations 900 for wireless communication by a TX UE, in accordance with certain aspects of the present disclosure. Operations 900 may be performed, for example, by UE 120a in FIG. 1 and/or FIG. 2.

Operations 900 may be implemented as software components that are executed and run on one or more processors (e.g., controller/processor 280 of FIG. 2). Further, the transmission and reception of signals by the TX UE in operations 900 may be enabled, for example, by one or more antennas (e.g., antennas 252 of FIG. 2). In certain aspects, the transmission and/or reception of signals by the TX UE may be implemented via a bus interface of one or more processors (e.g., controller/processor 280) obtaining and/or outputting signals.

Operations 900 begin, at block 902, by the TX UE transmitting a TB in a first slot of a current reservation period, wherein the transmission of the TB reserves a future resource in the current reservation period for retransmission of the TB.

At block 904, the TX UE indicates, when transmitting the first TB, a period to periodically reserve one or more resources, in one or more future reservation periods, for transmissions of one or more other TBs.

At block 906, the TX UE takes action to limit or release a number of the one or more resources periodically reserved in the one or more future reservation periods for the transmission of the one or more other TBs.

Figure 10:
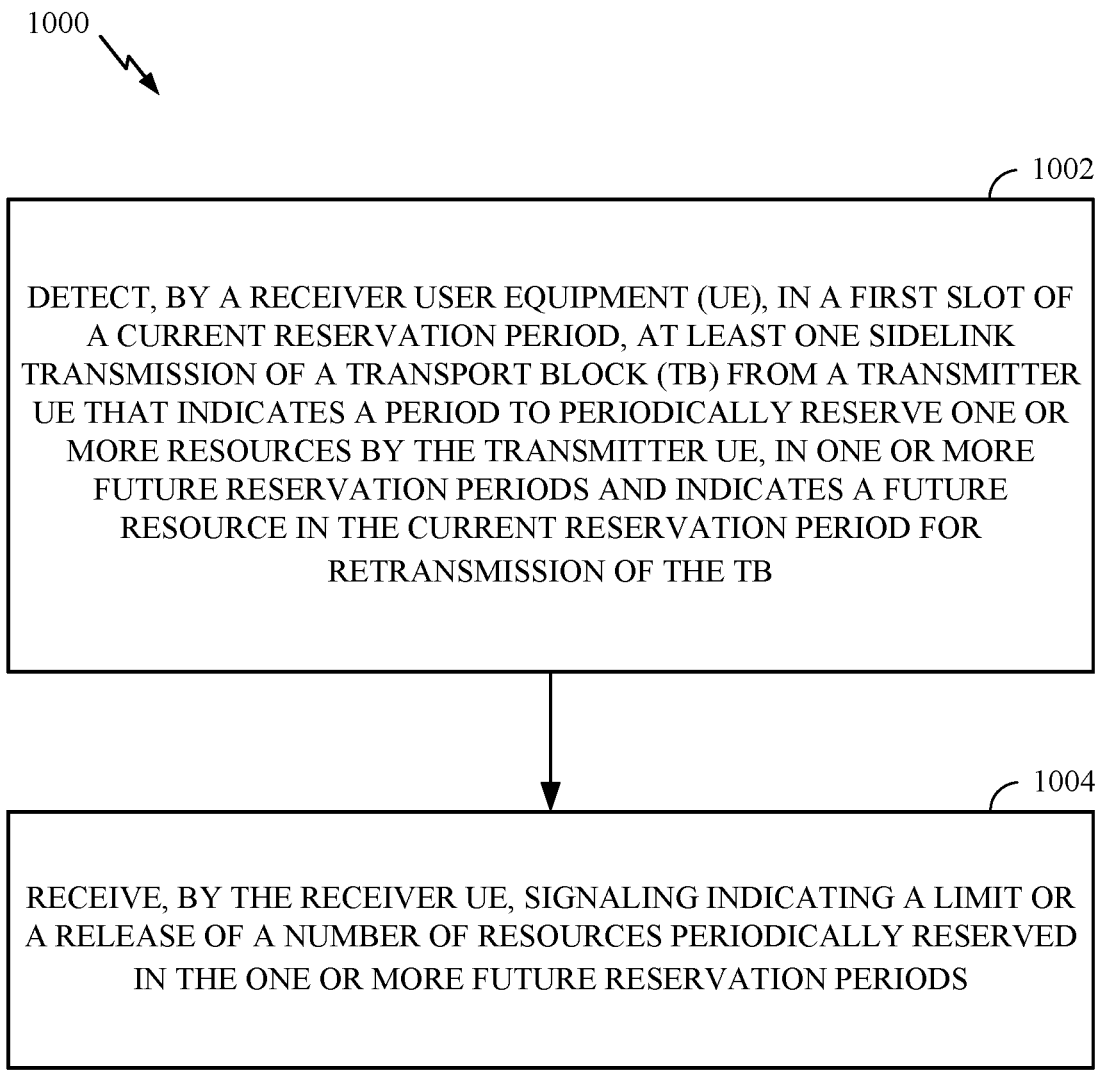
FIG. 10 is a flow diagram illustrating example operations for wireless communication by a receiver (RX) UE, in accordance with certain aspects of the present disclosure.

FIG. 10 is a flow diagram illustrating example operations 1000 for wireless communication by an RX UE, in accordance with certain aspects of the present disclosure. For example, operations 1000 may be performed by UE 120b or 120c of FIG. 1 or UE 120a of FIG. 2. Operations 1000 may be considered complementary to operations 900 of FIG. 9 to detect periodic resource reservation indications and/or the release of resources reserved by a TX UE performing operations 900 of FIG. 9.

Operations 1000 may be implemented as software components that are executed and run on one or more processors (e.g., controller/processor 280 of FIG. 2). Further, the transmission and reception of signals by the RX UE in operations 1000 may be enabled, for example, by one or more antennas (e.g., antennas 252 of FIG. 2). In certain aspects, the transmission and/or reception of signals by the RX UE may be implemented via a bus interface of one or more processors (e.g., controller/processor 280) obtaining and/or outputting signals.

Operations 1000 begin, at block 1002, by the RX UE detecting, in a first slot of a current reservation period, at least one sidelink transmission of a TB from a TX UE that indicates a period to periodically reserve one or more resources by the transmitter UE, in one or more future reservation periods and indicates a future resource in the current reservation period for retransmission of the TB.

At block 1004, the RX UE receives signaling indicating a limit or a release of a number of resources periodically reserved in the one or more future reservation periods.

In aspects of the present disclosure, a TX UE may be configured to limit a number of resources periodically reserved in subsequent reservation periods. For example, the TX UE may enable periodical reservation in a certain number of transmissions (e.g., enable periodical reservation in a first M transmissions, where M is an integer greater than or equal to one) of a packet (e.g., TB) in a transmission period (e.g., interval) and disable periodic reservation of resources in future reservation periods, after a certain number of transmissions (e.g., disable periodical reservation after the first M transmissions) of the packet in the current transmission period.

To enable and/or disable periodical reservation, in a first M transmissions (or retransmissions) of a packet in a transmission period, the TX UE may indicate a certain value for a period in its sidelink control information(s) (SCI(s)) (e.g., the parameter resource reservation period in SCI 1-A). An RX UE detecting these indications from the TX UE, may learn that there will be M resources reserved in future reservation periods (e.g., the next one or more reservation periods).

After M transmissions (or retransmissions) of the packet in the current reservation period, however, the TX UE may disable the periodical reservation. As an example, a parameter resource reservation period, in SCI 1-A may be set to a value that indicates and/or implies an invalid period value. The invalid period value may indicate that periodical reservation is disabled for remaining retransmissions of the TB in the current reservation period. For example, a parameter, resource reservation period, in SCI 1-A set to a value of '0' may disable periodical reservation.

Figure 11:
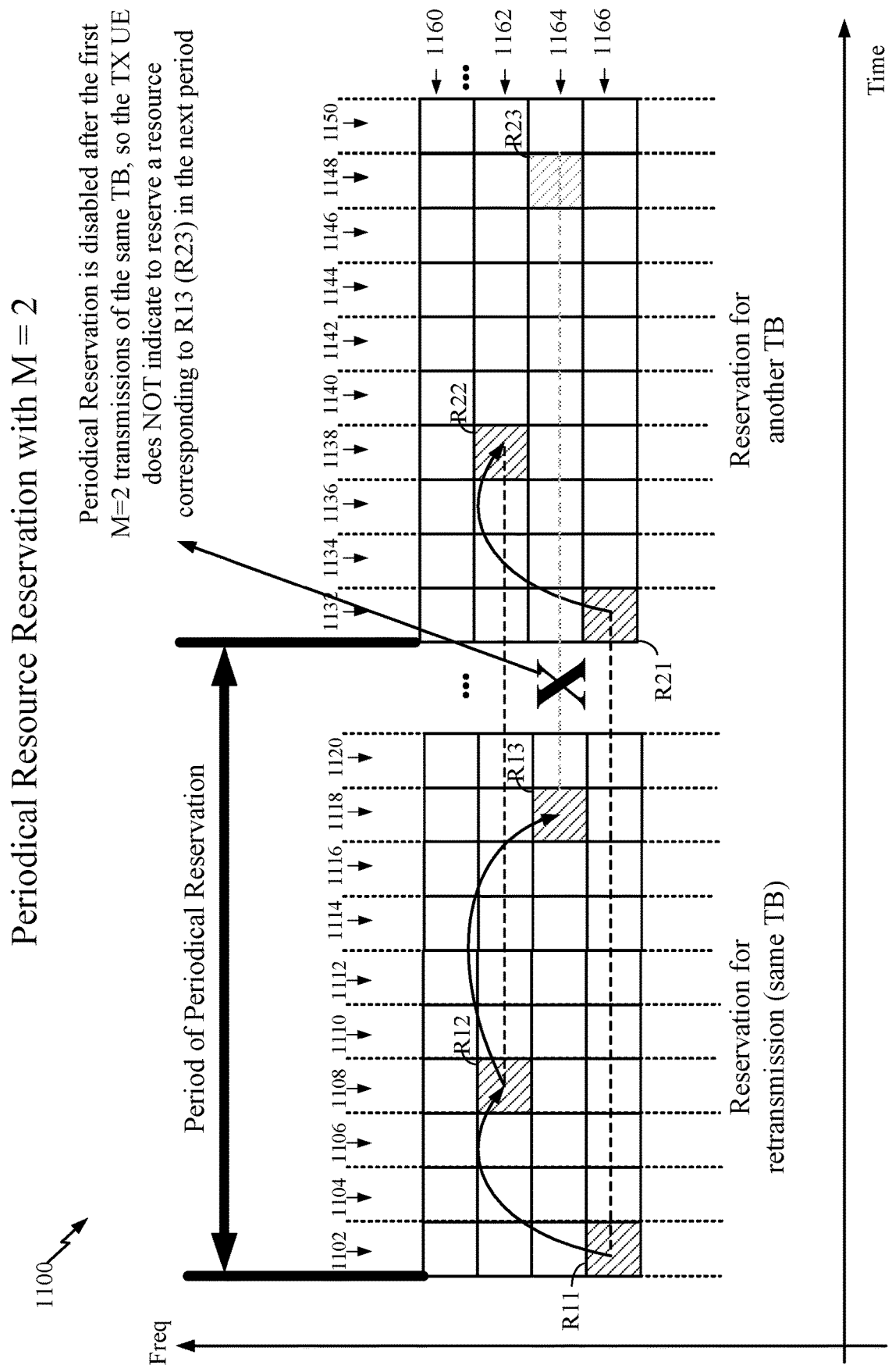
FIG. 11 is an exemplary transmission timeline illustrating periodical resource reservation, enabled for a limited number of transmissions, by a CV2X device, in accordance with certain aspects of the present disclosure.

Limiting the number of transmissions for which periodic reservation is allowed may be understood with reference to FIG. 11, which shows an example where periodic reservations are disabled after two transmissions of a TB (e.g., where M=2).

FIG. 11 is an exemplary transmission timeline 1100 illustrating periodical resource reservation, enabled for a limited number of transmissions (e.g., two transmissions), by a CV2X device, in accordance with aspects of the present disclosure. As shown in FIG. 11, similar to the example shown in FIG. 8, an initial transmission of a TB at resource R11 in a current reservation period reserves a resource R21 in a subsequent reservation period for transmission of another TB, as well as a resource R23 in the current reservation for retransmission of the same TB. The retransmission on resource R12 reserves resource R22 in the subsequent reservation period, e.g., for retransmission of the other TB, as well as another resource R13, in the current reservation period, for retransmission of the same TB.

Because the retransmission on R12 is the second transmission of the TB in the current reservation period and M=2, periodical reservation may be disabled for subsequent transmissions of the same TB. Therefore, as shown in FIG. 11, a retransmission (where needed) at reserved resource R13 does not reserve additional resources in the subsequent reservation period (as indicated by the X) (or in more than one subsequent reservation period).

The value of M may be determined in various manners and/or based on various considerations. In some cases, the value of M may be selected by the TX UE and indicated in SCI (e.g., in a first SCI or in a second SCI) (e.g., to an RX UE). In some cases, the certain number of transmissions of the TB in the current reservation period allowed before periodic reservation is disabled (e.g., the value of M) may be pre-determined (i.e., configured, pre-configured, or pre-defined (specified in the specification)).

In some cases, the value of M may be determined based on one or more other parameters. The parameters may include traffic priority, wherein a higher priority indicates a larger M value. The parameters may include modulation and coding schemes (MCSs), wherein a higher MCS indicates a larger M value. The parameters may include congestion level, wherein a higher channel busy ratio (CBR) indicates a smaller M value. The parameters may include a maximum number of reservations (i.e., a maximum number of reservations a sidelink TX UE can make for (re)transmission of a TB while transmitting the TB), wherein a larger number of maximum reservations indicates a larger M value. In one example, the M value may be the same as the (pre)configured maximum number of reservations.

In some cases, the value of M may have special meaning. For example, if the M resources reserved in future reservation periods is equal to one, only the first transmission of a packet (e.g., a TB) may indicate a periodical reservation. Accordingly, periodical reservation may be disabled for retransmissions of the packet in the subsequent reservation periods.

In another example, the value of M resources reserved in future reservation periods may be equal to parameter sl-MaxNumPerReserve, i.e., periodical reservation may be enabled in the first sl-MaxNumPerReserve transmissions of a packet. The parameter, sl-MaxNumPerReserve, may indicate the maximum number of reservations a TX UE may make when transmitting a packet (and the reservation may include the current transmission, as well as a number of reservations in future slots for retransmission of the packet). If parameter, sl-MaxNumPerReserve, is equal to two or three, the number of reservations a TX UE may make when transmitting a packet may include the current transmission plus one or two reservations, respectively, for retransmission in future slots within the period.

According to 3GPP Release 16, a packet (e.g., TB) may be transmitted up to 32 times. This 32 amount limit on the maximum number of hybrid automatic repeat request (HARQ) transmissions of a TB may be configured by parameter, sl-MaxTxTransNumPSSCH-r16. Accordingly, when periodical reservation is enabled, the ability to transmit a packet 32 times in a current period also means that 32 transmission occasions may be reserved in future reservation periods (i.e., in the next one or multiple periods).

In some cases, to indicate (to RX UEs) that periodic resources are available, a TX UE may be configured to signal the release of a number of resources periodically reserved in subsequent reservation periods. For example, N (re)transmissions (e.g., where N is an integer greater than or equal to one) of a TB in a current reservation period results in N resources being reserved in a future period. If less than N transmissions (N1<N, where N1 is an integer greater than or equal to one) are needed (e.g., if the UE does not receive NACK feedback after N1 transmissions of a TB in the next reservation period, the TX UE may signal the release of the remaining resources reserved by periodical reservation so that other UEs may be able to use (i.e., reserve) these resources. This may help to reduce resource waste where a TX UE is configured for periodical reservation.

In some cases, the signaling releasing the reservation may be indicated via an explicit parameter in SCI or a medium access control (MAC) control element (CE) (MAC-CE). In some examples, the signaling releasing the reservation of one or more resources in one or more future reservation periods may be indicated implicitly via SCI indicating no reservation of future resources. For example, a TX UE may transmit a sidelink transmission with a parameter, time resource reservation, in SCI indicating only one resource in time resource allocation (i.e., implicitly indicating no reservation of future resources in the same period for the transmission).

In certain aspects of the present disclosure, a TX UE may take action to avoid persistent collisions caused by periodical resource reservation. For example, a TX UE may transmit a TB in a first slot of a current reservation period and reserve, when transmitting the TB, one or more resources in one or more future reservation periods. A time slot for each of the one or more resources reserved in each of the future reservation periods may be determined based on the first slot and a first period-dependent offset parameter (e.g., such that resource reservation by the TX UE is staggered across the reservation periods).

Figure 12:
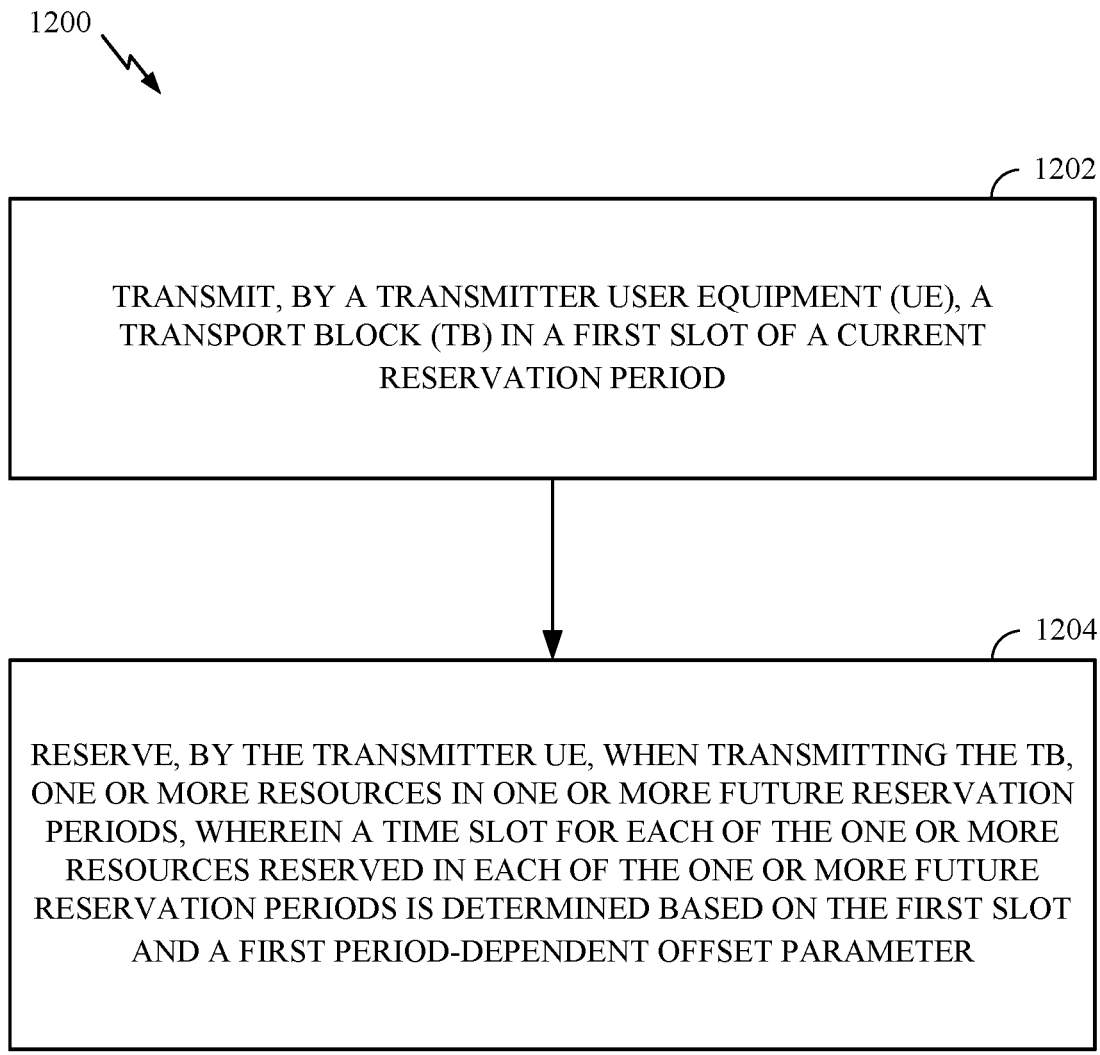
FIG. 12 is a flow diagram illustrating example operations for wireless communication by a TX UE, in accordance with certain aspects of the present disclosure.

FIG. 12 is a flow diagram illustrating example operations 1200 for wireless communications by a TX UE, in accordance with certain aspects of the present disclosure. Operations 1200 may be performed, for example, by UE 120a in FIG. 1 and/or FIG. 2.

Operations 1200 may be implemented as software components that are executed and run on one or more processors (e.g., controller/processor 280 of FIG. 2). Further, the transmission and reception of signals by the TX UE in operations 1200 may be enabled, for example, by one or more antennas (e.g., antennas 252 of FIG. 2). In certain aspects, the transmission and/or reception of signals by the TX UE may be implemented via a bus interface of one or more processors (e.g., controller/processor 280) obtaining and/or outputting signals.

Operations 1200 begin, at block 1202, by the TX UE transmitting a TB in a first slot of a current reservation period.

At block 1204, the TX UE reserves, when transmitting the first TB, one or more resources in one or more future reservation periods, wherein a time slot for each of the one or more resources reserved in each of the future reservation periods is determined based on the first slot and a first period-dependent offset parameter.

Figure 13:
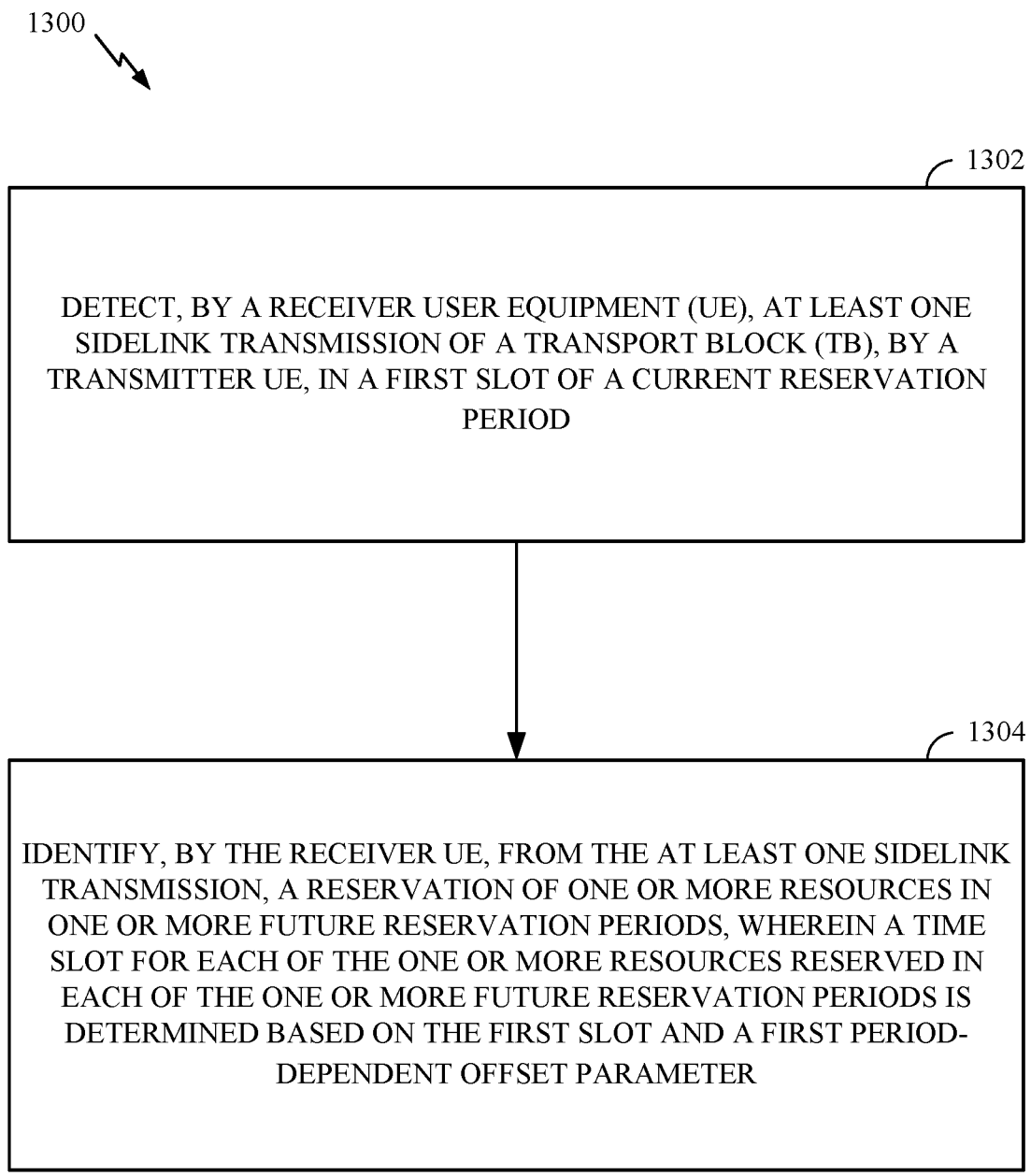
FIG. 13 is a flow diagram illustrating example operations for wireless communication by an RX UE, in accordance with certain aspects of the present disclosure.

FIG. 13 is a flow diagram illustrating example operations 1300 for wireless communications by an RX UE, in accordance with certain aspects of the present disclosure. Operations 1300 may be performed, for example, by UE 120b or 120c of FIG. 1 or UE 120a of FIG. 2. Operations 1300 may be considered complementary to operations 1200 of FIG. 12. For example, operations 1300 may be performed by an RX UE to detect resources reserved by a TX UE performing operations 1200 of FIG. 12.

Operations 1300 may be implemented as software components that are executed and run on one or more processors (e.g., controller/processor 280 of FIG. 2). Further, the transmission and reception of signals by the RX UE in operations 1300 may be enabled, for example, by one or more antennas (e.g., antennas 252 of FIG. 2). In certain aspects, the transmission and/or reception of signals by the RX UE may be implemented via a bus interface of one or more processors (e.g., controller/processor 280) obtaining and/or outputting signals.

Operations 1300 begin, at block 1302, by the RX UE detecting at least one sidelink transmission of a TB in a first slot of a current reservation period.

At block 1304, the RX UE identifies, from the at least one sidelink transmission, a reservation of one or more resources in one or more future reservation periods, wherein a time slot for each of the one or more resources reserved in each of the one or more future reservation periods is determined based on the first slot and a first period-dependent offset parameter.

In certain aspects of the present disclosure, a TX UE may be configured to stagger resource reservations in future periods to avoid persistent collision. For example, when a TX UE transmits periodical transmission in slot n, the TX UE may transmit the next transmission (e.g., the next TB in a future reservation period) in slot n+P (e.g., a number of logical or physical slots), where P is the period of the periodical transmission. With reservation staggering, the transmission of the future (e.g., next) packet (e.g., TB) may be transmitted in slot n+P+k, where k is a staggering value.

When periodical resource reservation is enabled (based on 3GPP Release 16), a transmission (e.g., physical sidelink control channel (PSCCH)/PSSCH) in slot n means that corresponding resources in slot n+jP are also reserved. P is a period of periodical reservation (e.g., number of physical or logical slots), j is the number of periods during which periodical reservation is valid (e.g., j=0,1, . . . , C_resel−1, C_resel), and n is the slot.

In certain aspects, using staggering for periodical reservation, a transmission in slot n may also reserve a corresponding resource in slot n+P+k, where k is the value of a staggering parameter. More specifically, a transmission in slot n of period j may also reserve the corresponding resources in slot n+jP+$k_j$, where $k_j$ is a period-specific staggering value.

For example, a UE may be configured with eight staggering values (e.g., {−3, −2, −1, 0, 1, 2, 3, 4}) and select one of these staggering values as its staggering parameter (e.g., k parameter). The UE may indicate this selected value in a transmission in slot n, which implies that the resource slot n+P+k is reserved (e.g., in a future reservation period).

In another example, a UE may be configured with eight staggering values (e.g., {−3, −2, −1, 0, 1, 2, 3, 4}) with indices 0,1, . . . , 7. The UE may determine an index value for a future period (e.g., next period) based on a layer 1 (L1) source identifier (ID) (which is carried in SCI) and a current slot index (e.g., as, k=mod(n+L1_ID,8)).

Figure 14:
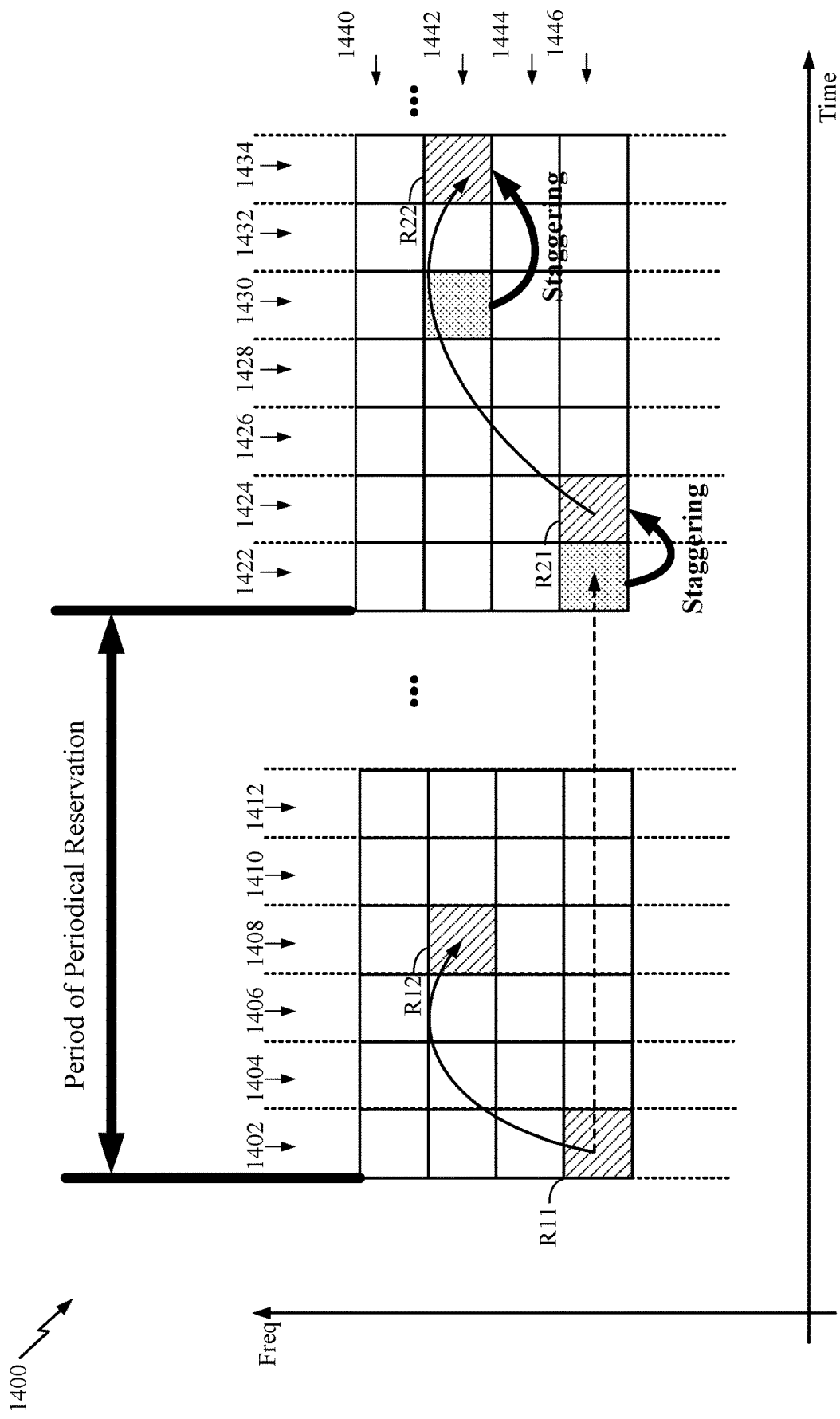
FIG. 14 is an exemplary transmission timeline illustrating periodical resource reservation staggering by a CV2X device, in accordance with certain aspects of the present disclosure.

The use of staggering for periodical reservation may be understood with reference to FIG. 14. FIG. 14 is an exemplary transmission timeline 1400 illustrating periodical resource reservation staggering by a CV2X device, in accordance with certain aspects of the present disclosure. Similar to the examples shown in FIGS. 8 and 11, an initial transmission of a TB at resource R11 in a current reservation period reserves a resource R21 in a subsequent reservation period for transmission of another TB. As illustrated, however, rather than be in the same slot of the subsequent period as resource R11 (the first slot), a staggering value (of one in this example (e.g., k=1)), results in resource R21 being in a different slot (the second slot) in the subsequent period.

As illustrated, staggering may also be applied to resources reserved for retransmission. For example, the illustrated example shows a staggering value of k applied to resource R22 reserved for retransmission of a TB. Thus R22 is two slots over (e.g., two additional slots to the right), relative to a corresponding resource R12 of the previous reservation period.

Determination of the staggering value may ensure that the TX UE and RX UE have a similar understanding for purposes of avoiding transmission collision. In some examples, the staggering value may be determined by the TX UE and subsequently indicated via control signaling (e.g., SCI) (e.g., first or second stage control). In some examples, the staggering value may have a value implied by one or more other parameters. The other parameters may include at least one of an ID of the transmitter UE, an index of a starting sub channel of a PSSCH transmission, or a slot index of the PSSCH transmission.

Example Wireless Communication Devices

Figure 15:
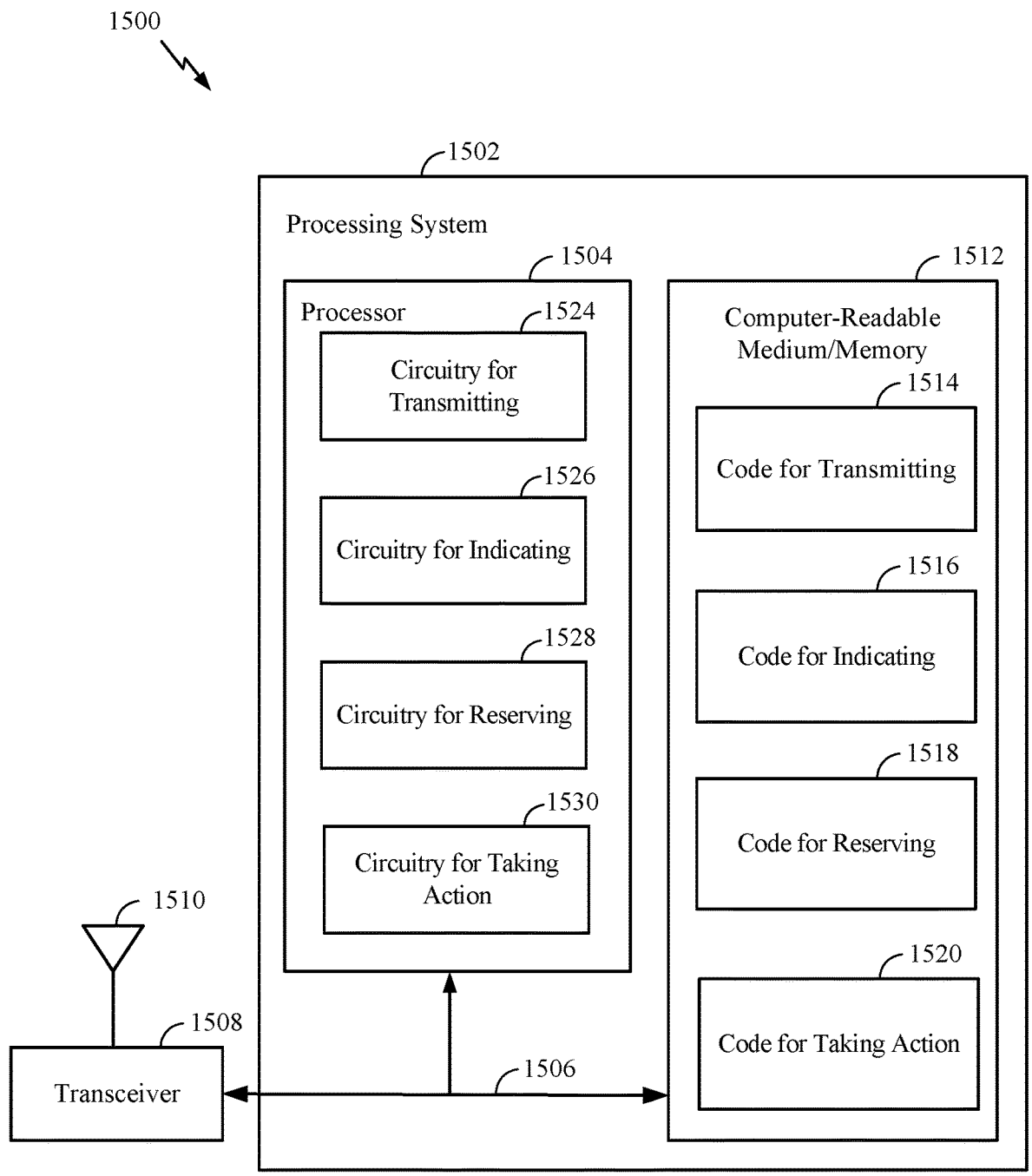
FIG. 15 illustrates a communications device that may include various components configured to perform the operations illustrated in FIG. 9 and/or FIG. 12, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 9 and/or FIG. 12. Communications device 1500 may be an example of means for enhanced resource reservation, as described herein.

Communications device 1500 includes a processing system 1502 coupled to a transceiver 1508 (e.g., a transmitter and/or a receiver). Transceiver 1508 is configured to transmit and receive signals for communications device 1500 via an antenna 1510, such as the various signals as described herein. Processing system 1502 may be configured to perform processing functions for the communications device 1500, including processing signals received and/or to be transmitted by the communications device 1500. Communications device 1500, or its sub-components, may be implemented in code (e.g., as communications management software or firmware) executed by a processor, or any combination thereof. If implemented in code executed by a processor, the functions of communications device 1500, or its sub-components may be executed by a general-purpose processor, a digital signal processor (DSP), an application-specific integrated circuit (ASIC), a field programmable gate array (FPGA) or other programmable logic device.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by processor 1504, cause processor 1504 to perform the operations illustrated in FIG. 9 and/or FIG. 12, or other operations for performing the various techniques discussed herein for enhanced resource reservation.

In certain aspects, computer-readable medium/memory 1512 stores code 1514 (e.g., an example of means for) for transmitting (e.g., for transmitting a TB in a first slot of a current reservation period); code 1516 (e.g., an example of means for) for indicating (e.g., for indicating, when transmitting the TB, a period to periodically reserve one or more resources, in one or more future reservation periods, for transmissions of one or more other TBs); code 1518 (e.g., an example of means for) for reserving (e.g., for reserving, when transmitting the TB, a future resource in the current reservation period for retransmission of the TB and/or for reserving, when transmitting the TB, one or more resources in one or more future reservation periods, wherein a time slot for each of the one or more resources reserved in each of the one or more future reservation periods is determined based on the first slot and a first period-dependent offset parameter); and code 1520 (e.g., an example of means for) for taking action (e.g., for taking action to limit or release a number of the one or more resources periodically reserved in the one or more future reservation periods for the transmissions of the one or more other TBs).

In another implementation, communications device 1500, or its sub-components, may be implemented in hardware (e.g., in joint feedback management circuitry). The circuitry may comprise a processor, a DSP, an ASIC, an FPGA or other programmable logic device, discrete gate or transistor logic, discrete hardware components, or any combination thereof designed to perform the functions described in the present disclosure.

In certain aspects, processor 1504 has circuitry configured to implement the code stored in computer-readable medium/memory 1512. Processing system 1502 includes circuitry 1524 (e.g., an example of means for) for transmitting (e.g., for transmitting a TB in a first slot of a current reservation period); circuitry 1526 (e.g., an example of means for) for indicating (e.g., for indicating, when transmitting the TB, a period to periodically reserve one or more resources, in one or more future reservation periods, for transmissions of one or more other TBs); circuitry 1528 (e.g., an example of means for) for reserving (e.g., for reserving, when transmitting the TB, a future resource in the current reservation period for retransmission of the TB and/or for reserving, when transmitting the TB, one or more resources in one or more future reservation periods, wherein a time slot for each of the one or more resources reserved in each of the one or more future reservation periods is determined based on the first slot and a first period-dependent offset parameter); and circuitry 1530 (e.g., an example of means for) for taking action (e.g., for taking action to limit or release a number of the one or more resources periodically reserved in the one or more future reservation periods for the transmissions of the one or more other TBs).

In some cases, the operations illustrated in FIG. 9 and FIG. 12, as well as other operations described herein, may be implemented by one or more means-plus-function components. For example, in some cases, such operations may be implemented by means for transmitting, means for indicating, means for reserving, and means for taking action.

In some cases, means for indicating, means for reserving, and means for taking action, includes a processing system, which may include one or more processors, such as the receive processor 258, transmit processor 264, TX MIMO processor 266, and/or controller/processor 280 of UE 120*a* illustrated in FIG. 2 and/or the processing system 1502 of communications device 1500 in FIG. 15.

In some cases, means for transmitting or sending (or means for outputting for transmission) may include transceivers 254 and/or antenna(s) 252 of UE 120*a* illustrated in FIG. 2 and/or transceiver 1508 and antenna 1510 of communications device 1500 in FIG. 15.

In some cases, means for transmitting may include various processing system components, such as: one or more processors 1504 in FIG. 15, or aspects of UE 120*a* depicted in FIG. 2, including transmit processor 264, TX MIMO processor 266, and/or controller/processor 280 (including V2X manager 122).

Notably, FIG. 15 is just one use example, and many other examples and configurations of communications device 1500 are possible.

Figure 16:
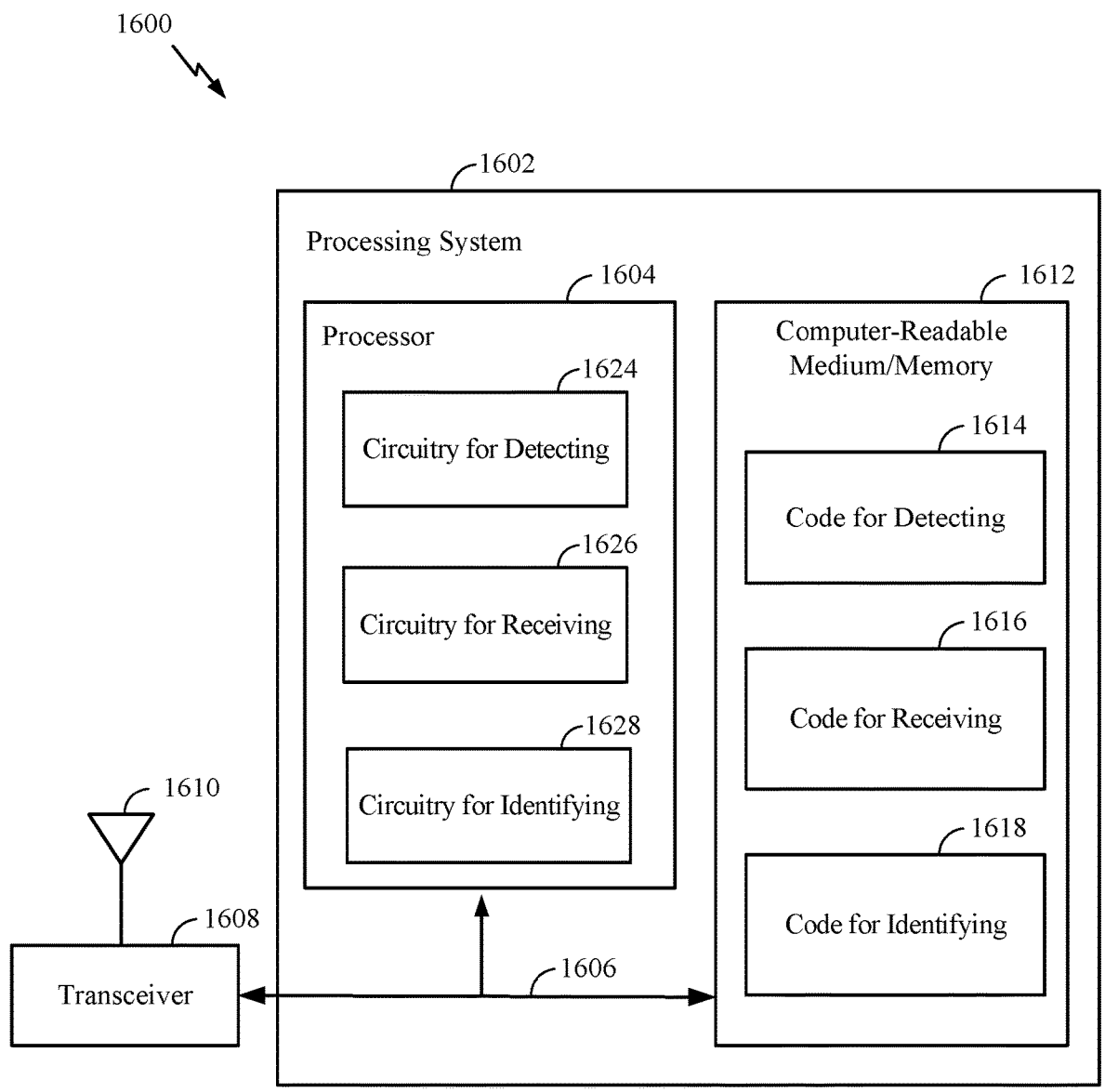
FIG. 16 illustrates a communications device that may include various components configured to perform the operations illustrated in FIG. 10 and/or FIG. 13, in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 10 and/or FIG. 13. Communications device 1600 may be an example of means for enhanced resource reservation, as described herein.

Communications device 1600 includes a processing system 1602 coupled to a transceiver 1608 (e.g., a transmitter and/or a receiver). Transceiver 1608 is configured to transmit and receive signals for communications device 1600 via an antenna 1610, such as the various signals as described herein. Processing system 1602 may be configured to perform processing functions for communications device 1600, including processing signals received and/or to be transmitted by communications device 1600. Communications device 1600, or its sub-components, may be implemented in code (e.g., as communications management software or firmware) executed by a processor, or any combination thereof. If implemented in code executed by a processor, the functions of communications device 1600, or its sub-components may be executed by a general-purpose processor, a DSP, an ASIC, an FPGA, or other programmable logic device.

Processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 10 and/or FIG. 13, or other operations for performing the various techniques discussed herein for enhanced resource reservation.

In certain aspects, computer-readable medium/memory 1612 stores code 1614 (e.g., an example means for) for detecting (e.g., for detecting, in a first slot of a current reservation period, at least one sidelink transmission of a TB from a transmitter UE that indicates a period to periodically reserve one or more resources by the transmitter UE, in one or more future reservation periods and indicates a future resource in the current reservation period for retransmission of the first TB); code 1616 (e.g., an example means for) for receiving (e.g., for receiving signaling indicating a limit or a release of a number of resources periodically reserved in the one or more future reservation periods); and code 1618 (e.g., an example means for) for identifying (e.g., for identifying, from the at least one sidelink transmission, a reservation of one or more resources in one or more future reservation periods, wherein a time slot for each of the one or more resources reserved in each of the one or more future reservation periods is determined based on the first slot and a first period-dependent offset parameter).

In another implementation, communications device 1600, or its sub-components, may be implemented in hardware (e.g., in joint feedback management circuitry). The circuitry may comprise a processor, a DSP, an ASIC, an FPGA or other programmable logic device, discrete gate or transistor logic, discrete hardware components, or any combination thereof designed to perform the functions described in the present disclosure.

In certain aspects, processor 1604 has circuitry configured to implement the code stored in computer-readable medium/memory 1612. Processing system 1602 includes circuitry (e.g., an example of means for) 1624 for detecting (e.g., for detecting, in a first slot of a current reservation period, at least one sidelink transmission of a TB from a transmitter UE that indicates a period to periodically reserve one or more resources by the transmitter UE, in one or more future reservation periods and indicates a future resource in the current reservation period for retransmission of the first TB); circuitry 1626 (e.g., an example means for) for receiving (e.g., for receiving signaling indicating a limit or a release of a number of resources periodically reserved in the one or more future reservation periods); and circuitry 1628 (e.g., an example means for) for identifying (e.g., for identifying, from the at least one sidelink transmission, a reservation of one or more resources in one or more future reservation periods, wherein a time slot for each of the one or more resources reserved in each of the one or more future reservation periods is determined based on the first slot and a first period-dependent offset parameter).

In some cases, the operations illustrated in FIG. 10 and FIG. 13, as well as other operations described herein, may be implemented by one or more means-plus-function components. For example, in some cases, such operations may be implemented by means for detecting, means for receiving, and means for identifying.

In some cases, means for detecting and means for identifying, includes a processing system, which may include one or more processors, such as the receive processor 258, transmit processor 264, TX MIMO processor 266, and/or controller/processor 280 of UE 120*a* illustrated in FIG. 2 and/or the processing system 1602 of communications device 1600 in FIG. 16.

In some examples, means for receiving (or means for obtaining) may include transceivers 254 and/or antenna(s) 252 of UE 120*a* illustrated in FIG. 2 and/or transceiver 1608 and antenna 1610 of communications device 1600 in FIG. 16.

In some examples, means for receiving may include various processing system components, such as: one or more processors 1604 in FIG. 16, or aspects of UE 120*a* depicted in FIG. 2, including receive processor 238 and/or controller/processor 280 (including V2X manager 122).

Notably, FIG. 16 is just one use example, and many other examples and configurations of communications device 1600 are possible.

V2X manager 122 (e.g., V2X manager 122*a*, 122*b*, 122*c* in FIG. 1) may support wireless communication in accordance with examples as disclosed herein.

V2X manager 122 may be an example of means for performing various aspects described herein. V2X manager 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, V2X manager 122, or its sub-components, may be implemented in code (e.g., as configuration management software or firmware) executed by a processor, or any combination thereof. If implemented in code executed by a processor, the functions of V2X manager 122, or its sub-components may be executed by a general-purpose processor, a DSP, an ASIC, a FPGA or other programmable logic device.

In some examples, V2X manager 122 may be configured to perform various operations (e.g., receiving, determining, transmitting) using or otherwise in cooperation with transceiver 1508 and/or transceiver 1608.

V2X manager 122, or its sub-components, may be physically located at various positions, including being distributed such that portions of functions are implemented at different physical locations by one or more physical components. In some examples, V2X manager 122, or its sub-components, may be a separate and distinct component in accordance with various aspects of the present disclosure. In some examples, V2X manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Implementation examples are described in the following numbered aspects:

Aspect 1: A method for wireless communications by a transmitter user equipment (UE), comprising: transmitting a transport block (TB) in a first slot of a current reservation period, wherein the transmission of the TB reserves a future resource in the current reservation period for retransmission of the TB; indicating, when transmitting the TB, a period to periodically reserve one or more resources, in one or more future reservation periods, for transmissions of one or more other TBs; and taking action to limit or release a number of the one or more resources periodically reserved in the one or more future reservation periods for the transmissions of the one or more other TBs.

Aspect 2: The method of Aspect 1, wherein taking action comprises disabling the periodic reservation of the one or more resources in each of the one or more future reservation periods, after a certain number of transmissions of the TB in the current reservation period.

Aspect 3: The method of Aspect 2, wherein the disabling comprises indicating a certain value for a period, when subsequently transmitting the TB in the future resource reserved in the current reservation period.

Aspect 4: The method of Aspect 3, wherein the certain value indicates an invalid period.

Aspect 5: The method of Aspect 3 or 4, wherein the certain value comprises a value that indicates disabling of periodical reservation for remaining retransmissions of the TB in the current reservation period.

Aspect 6: The method of any of Aspects 2-5, wherein the certain number of transmissions is pre-determined.

Aspect 7: The method of any of Aspects 2-6, wherein the certain number of transmissions is determined based on one or more other parameters, wherein the one or more other parameters comprise a traffic priority, a modulation and coding scheme (MCS), a congestion level, or a maximum number of reservations.

Aspect 8: The method of any of Aspects 2-8, further comprising selecting the certain number of transmissions; and indicating, to a receiver UE, the certain number of transmissions via sidelink control information (SCI).

Aspect 9: The method of any of Aspects 1-8, wherein taking action comprises indicating a release of previously reserved resources in the one or more future reservation periods.

Aspect 10: The method of Aspect 9, wherein the release is indicated via a parameter in sidelink control information (SCI) or a medium access control (MAC) control element (CE) (MAC-CE).

Aspect 11: The method of Aspect 9 or 10, wherein the release is indicated implicitly via sidelink control information (SCI) indicating no reservation of future resources.

Aspect 12: A method for wireless communications by a receiver user equipment (UE), comprising: detecting, in a first slot of a current reservation period, at least one sidelink transmission of a transport block (TB) from a transmitter UE that indicates a period to periodically reserve one or more resources by the transmitter UE, in one or more future reservation periods and indicates a future resource in the current reservation period for retransmission of the TB; and receiving signaling indicating a limit or a release of a number of resources periodically reserved in the one or more future reservation periods.

Aspect 13: The method of Aspect 12, wherein the signaling disables the periodic reservation of the one or more resources in each of the one or more future reservation periods, after a certain number of transmissions of the TB in the current reservation period.

Aspect 14: The method of Aspect 13, wherein the signaling indicates a certain value for a period when subsequently transmitting the TB in the future resource reserved for the current reservation period.

Aspect 15: The method of Aspect 14, wherein the certain value indicates an invalid period.

Aspect 16: The method of Aspect 14 or 15, wherein the certain value comprises a value that indicates disabling of periodical reservation for remaining retransmissions of the TB in the current reservation period.

Aspect 17: The method of any of Aspects 13-16, wherein the certain number of transmissions is pre-determined.

Aspect 18: The method of any of Aspects 13-17, wherein the certain number of transmissions is determined based on one or more other parameters, wherein the one or more other parameters comprise a traffic priority, a modulation and coding scheme (MCS), a congestion level, or a maximum number of reservations.

Aspect 19: The method of any of Aspects 13-18, further comprising: receiving, from a transmitter UE, an indication of the certain number of transmissions via sidelink control information (SCI), wherein the certain number of transmissions is selected by the transmitter UE.

Aspect 20: The method of any of Aspects 12-19, wherein the signaling indicates the release of previously reserved resources in the one or more future reservation periods.

Aspect 21: The method of Aspect 20, wherein the release is indicated via a parameter in: sidelink control information (SCI); or a medium access control (MAC) control element (CE) (MAC-CE).

Aspect 22: The method of Aspect 20 or 21, wherein the release is indicated implicitly via sidelink control information (SCI) indicating no reservation of future resources.

Aspect 23: A method for wireless communications by a transmitter user equipment (UE), comprising transmitting a first transport block (TB) in a first slot of a current reservation period; and reserving, when transmitting the TB, one or more resources in one or more future reservation periods, wherein a time slot for each of the one or more resources reserved in each of the one or more future reservation periods is determined based on the first slot and a first period-dependent offset parameter.

Aspect 24: The method of Aspect 15, further comprising reserving, when transmitting the TB, a resource in a second slot of the current reservation period for retransmission of the TB; and reserving, when retransmitting the TB in the resource reserved in the second slot, one or more resources in the one or more future reservation periods for TB retransmissions, wherein a time slot for the one or more resources reserved for the TB retransmissions in each of the one or more future reservation periods is determined based on the second slot and a second period-dependent offset parameter.

Aspect 25: The method of Aspect 24, wherein the first period-dependent offset and second period-dependent offset comprise different values.

Aspect 26: The method of any of Aspects 23-25, further comprising: determining the first period-dependent offset parameter; and indicating, to a receiver UE, the first period-dependent offset parameter via sidelink control information (SCI).

Aspect 27: The method of any of Aspects 23-26, wherein the first period-dependent offset parameter is implied by one or more parameters, wherein the one or more parameters comprise at least one of: an identifier (ID) of the transmitter UE, an index of a starting subchannel of a physical sidelink shared channel (PSSCH) transmission, or a slot index of the PSSCH transmission.

Aspect 28: A method for wireless communications by a receiver user equipment (UE), comprising: detecting at least one sidelink transmission of a transport block (TB), by a transmitter UE, in a first slot of a current reservation period; and identifying, from the at least one sidelink transmission, a reservation of one or more resources in one or more future reservation periods, wherein a time slot for each of the one or more resources reserved in each of the one or more future reservation periods is determined based on the first slot and a first period-dependent offset parameter.

Aspect 29: The method of Aspect 28, further comprising: detecting, based on a retransmission of the TB in a second slot in the current reservation period, a reservation of one or more resources in the one or more future reservation periods for TB retransmissions, wherein a time slot for the one or more resources reserved for the TB retransmissions in each of the one or more future reservation periods is determined based on the second slot and a second period-dependent offset parameter.

Aspect 30: The method of Aspect 29, wherein the first period-dependent offset parameter and second period-dependent offset parameter comprise different values.

Aspect 31: The method of any of Aspects 28-30, further comprising: receiving, from a transmitter UE, an indication of the first period-dependent offset parameter via sidelink control information (SCI), wherein the first period-dependent offset parameter is determined by the transmitter UE.

Aspect 32: The method of any of Aspects 28-31, wherein the first period-dependent offset parameter is implied by one or more parameters, wherein the one or more parameters comprise at least one of: an ID of the transmitter UE, an index of a starting subchannel of a physical sidelink shared channel (PSSCH) transmission, or a slot index of the PSSCH transmission.

Aspect 33: An apparatus, comprising: a memory; and one or more processors coupled to the memory, the memory and the one or more processors being configured to perform a method in accordance with any one of Aspects 1-32.

Aspect 34: An apparatus, comprising means for performing a method in accordance with any one of Aspects 1-32.

Aspect 35: A non-transitory computer-readable medium comprising executable instructions that, when executed by one or more processors of an apparatus, cause the apparatus to perform a method in accordance with any one of Aspects 1-32.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and base station (BS), next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by user equipments (UEs) with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9, FIG. 10, FIG. 12, and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a transmitter user equipment (UE), comprising:
   transmitting a transport block (TB) in a first resource of a current reservation period, wherein the TB:
      reserves a second resource, occurring after the first resource for retransmission of the TB, and
      indicates a period of a periodic reservation of one or more resources, in one or more future reservation periods, for transmissions of one or more other TBs; and
   taking action to limit or release a number of the one or more resources periodically reserved in the one or more future reservation periods for the transmissions of the one or more other TBs, wherein taking action comprises disabling the periodic reservation of the one or more resources in each of the one or more future reservation periods, after a certain number of transmissions of the TB in the current reservation period, wherein the disabling comprises indicating a certain value for a period when subsequently transmitting the TB in the second resource reserved in the current reservation period, wherein the certain value comprises a value that indicates disabling of periodical reservation, for remaining retransmissions of the TB in the current reservation period.

2. The method of claim 1, wherein the certain value indicates an invalid period.

3. The method of claim 1, wherein the certain number of transmissions is pre-determined.

4. The method of claim 1, wherein the certain number of transmissions is determined based on one or more other parameters, wherein the one or more other parameters comprise a traffic priority, a modulation and coding scheme (MCS), a congestion level, or a maximum number of reservations.

5. The method of claim 1, further comprising:
   selecting the certain number of transmissions; and
   indicating, to a receiver UE, the certain number of transmissions via sidelink control information (SCI).

6. The method of claim 1, wherein taking action comprises indicating a release of previously reserved resources in the one or more future reservation periods.

7. The method of claim 6, wherein the release is indicated via a parameter in:
   sidelink control information (SCI), or
   a medium access control (MAC) control element (CE) (MAC-CE).

8. The method of claim 6, wherein the release is indicated implicitly via sidelink control information (SCI) indicating no reservation of future resources.

9. A method for wireless communications by a receiver user equipment (UE), comprising:
   detecting, in a first resource of a current reservation period, at least one sidelink transmission of a transport block (TB) from a transmitter UE that indicates:
      a period of a periodic reservation of one or more resources by the transmitter UE, in one or more future reservation periods, and
      second resource, occurring after the first resource for retransmission of the TB; and
   receiving signaling indicating a limit or a release of a number of resources periodically reserved in the one or more future reservation periods, wherein the signaling disables the periodic reservation of the one or more resources in each of the one or more future reservation periods, after a certain number of transmissions of the TB in the current reservation period, wherein the signaling indicates a certain value for a period when subsequently transmitting the TB in the second resource reserved for the current reservation period, wherein the certain value comprises a value that indicates disabling of periodical reservation for remaining retransmission of the TB in the current reservation period.

10. The method of claim 9, wherein the certain value indicates an invalid period.

11. The method of claim 9, wherein the certain number of transmissions is pre-determined.

12. The method of claim 9, wherein the certain number of transmissions is determined based on one or more other parameters, wherein the one or more other parameters comprise a traffic priority, a modulation and coding scheme (MCS), a congestion level, or a maximum number of reservations.

13. The method of claim 9, further comprising:
   receiving, from the transmitter UE, an indication of the certain number of transmissions via sidelink control information (SCI), wherein the certain number of transmissions is selected by the transmitter UE.

14. The method of claim 9, wherein the signaling indicates release of previously reserved resources in the one or more future reservation periods.

15. The method of claim 14, wherein the release is indicated via a parameter in:
   sidelink control information (SCI); or
   a medium access control (MAC) control element (CE) (MAC-CE).

16. The method of claim 14, wherein the release is indicated implicitly via sidelink control information (SCI) indicating no reservation of future resources.

17. A processing system for wireless communications by a transmitter user equipment (UE), comprising:
   one or more processors individually or collectively configured to execute instructions stored on one or more memories and to cause the transmitter UE to:
      transmit a transport block (TB) in a first resource of a current reservation period, wherein the TB:
         reserves a second resource, occurring after the first resource for retransmission of the TB, and
         indicates a period of a periodic reservation of one or more resources, in one or more future reservation periods, for transmissions of one or more other TBs; and
      take action to limit or release a number of the one or more resources periodically reserved in the one or more future reservation periods for the transmissions of the one or more other TBs, wherein taking action comprises disabling the periodic reservation of the one or more resources in each of the one or more future reservation periods, after a certain number of transmissions of the TB in the current reservation period, wherein the disabling comprises indicating a certain value for a period when subsequently transmitting the TB in the second resource reserved in the current reservation period, wherein the certain value comprises a value that indicates disabling of periodical reservation, for remaining retransmissions of the TB in the current reservation period.

18. The processing system of claim 17, wherein, in order to take the action, the one or more processors are further configured to cause the transmitter UE to at least one of:
disable the periodic reservation of the one or more resources in each of the one or more future reservation periods, after a certain number of transmissions of the TB in the current reservation period; or
indicate a release of previously reserved resources in the one or more future reservation periods.

19. The processing system of claim 18, wherein:
in order to disable the periodic reservation, the one or more processors are further configured to cause the transmitter UE to indicate a certain value for a period when subsequently transmitting the TB in the second resource reserved in the current reservation period, and
the certain value indicates at least one of:
an invalid period; or
disabling of periodical reservation, for remaining retransmissions of the TB in the current reservation period.

20. The processing system of claim 18, wherein the one or more processors are further configured to cause the transmitter UE to determine the certain number of transmissions based on one or more other parameters, the one or more other parameters comprising a traffic priority, a modulation and coding scheme (MCS), a congestion level, or a maximum number of reservations.

21. A processing system for wireless communications by a receiver user equipment (UE), comprising:
one or more processors individually or collectively configured to execute instructions stored on one or more memories and to cause the receiver UE to:
detect, in a first slot of a current reservation period, at least one sidelink transmission of a transport block (TB) from a transmitter UE that indicates a period to periodically reserve one or more resources by the transmitter UE, in one or more future reservation periods and indicates a future resource for retransmission of the TB; and
receive signaling indicating a limit or a release of a number of resources periodically reserved in the one or more future reservation periods, wherein the signaling:
disables the periodic reservation of the one or more resources in each of the one or more future reservation periods, after a certain number of transmissions of the TB in the current reservation period;
indicates a certain value for a period when subsequently transmitting the TB in the future resource reserved for the current reservation period, the certain value indicating at least one of disabling of periodical reservation for remaining retransmissions of the TB in the current reservation period, or an invalid period; or
indicated release of previously reserved resources in the one or more future reservation periods.

22. The processing system of claim 21, wherein the certain number of transmissions is based on one or more other parameters, wherein the one or more other parameters comprise a traffic priority, a modulation and coding scheme (MCS), a congestion level, or a maximum number of reservations.

23. The processing system of claim 21, wherein the one or more processors are further configured to cause the receiver UE to:
receive, from the transmitter UE, an indication of the certain number of transmissions via sidelink control information (SCI), wherein the certain number of transmissions is selected by the transmitter UE.

* * * * *